(12) United States Patent
Poupyrev

(10) Patent No.: US 11,221,682 B2
(45) Date of Patent: *Jan. 11, 2022

(54) OCCLUDED GESTURE RECOGNITION

(71) Applicant: Google LLC, Mountain View, CA (US)

(72) Inventor: Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,374

(22) Filed: Jan. 13, 2021

(65) Prior Publication Data
US 2021/0132702 A1    May 6, 2021

Related U.S. Application Data

(63) Continuation of application No. 16/560,085, filed on Sep. 4, 2019, now Pat. No. 10,936,081, which is a continuation of application No. 15/703,511, filed on Sep. 13, 2017, now Pat. No. 10,409,385, which is a continuation of application No. 14/494,863, filed on Sep. 24, 2014, now Pat. No. 9,778,749.

(60) Provisional application No. 62/040,896, filed on Aug. 22, 2014.

(51) Int. Cl.
| | | |
|---|---|---|
| G06F 3/01 | (2006.01) | |
| G06F 21/31 | (2013.01) | |
| G01S 13/42 | (2006.01) | |
| G01S 13/88 | (2006.01) | |
| G06F 21/32 | (2013.01) | |

(52) U.S. Cl.
CPC .............. *G06F 3/017* (2013.01); *G01S 13/42* (2013.01); *G01S 13/88* (2013.01); *G06F 3/011* (2013.01); *G06F 21/316* (2013.01); *G06F 21/32* (2013.01)

(58) Field of Classification Search
CPC ................................ G06F 3/017; G01S 13/88
See application file for complete search history.

(56) References Cited

U.S. PATENT DOCUMENTS

| | | |
|---|---|---|
| 3,570,312 A | 3/1971 | Kreith |
| 3,610,874 A | 10/1971 | Gagliano |
| 3,752,017 A | 8/1973 | Lloyd et al. |
| (Continued) | | |

FOREIGN PATENT DOCUMENTS

| | | |
|---|---|---|
| CN | 1462382 | 12/2003 |
| CN | 1862601 | 11/2006 |
| (Continued) | | |

OTHER PUBLICATIONS

"Advisory Action", U.S. Appl. No. 14/504,139, dated Aug. 28, 2017, 3 pages.

(Continued)

*Primary Examiner* — Sepehr Azari
(74) *Attorney, Agent, or Firm* — Colby Nipper PLLC

(57) ABSTRACT

This document describes techniques and devices for occluded gesture recognition. Through use of the techniques and devices described herein, users may control their devices even when a user's gesture is occluded by some material between the user's hands and the device itself. Thus, the techniques enable users to control their mobile devices in many situations in which control is desired but conventional techniques do permit effective control, such as when a user's mobile computing device is occluded by being in a purse, bag, pocket, or even in another room.

20 Claims, 7 Drawing Sheets

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,321,930 A | 3/1982 | Jobsis et al. |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,024,533 A | 6/1991 | Egawa et al. |
| 5,121,124 A | 6/1992 | Spivey et al. |
| 5,298,715 A | 3/1994 | Chalco et al. |
| 5,309,916 A | 5/1994 | Hatschek |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,129,673 A | 10/2000 | Fraden |
| 6,179,785 B1 | 1/2001 | Martinosky et al. |
| 6,210,771 B1 | 4/2001 | Post et al. |
| 6,254,544 B1 | 7/2001 | Hayashi |
| 6,303,924 B1 | 10/2001 | Adan et al. |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,805,672 B2 | 10/2004 | Martin et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,209,775 B2 | 4/2007 | Bae et al. |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,750,841 B2 | 7/2010 | Oswald et al. |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Vaio et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,326,313 B2 | 12/2012 | McHenry et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,374,668 B1 | 2/2013 | Hayter et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,926,509 B2 | 1/2015 | Magar et al. |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Guofu et al. |
| 9,223,494 B1 | 12/2015 | DeSalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautianinen et al. |
| 9,346,167 B2 | 5/2016 | O'Connor et al. |
| 9,354,709 B1 | 5/2016 | Heller et al. |
| 9,412,273 B2 | 8/2016 | Ricci |
| 9,508,141 B2 | 11/2016 | Khachaturian et al. |
| 9,511,877 B2 | 12/2016 | Masson |
| 9,524,597 B2 | 12/2016 | Ricci |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,699,663 B1 | 7/2017 | Jovancevic |
| 9,729,986 B2 | 8/2017 | Crawley et al. |
| 9,746,551 B2 | 8/2017 | Scholten et al. |
| 9,766,742 B2 | 9/2017 | Papakostas |
| 9,778,749 B2 | 10/2017 | Poupyrev |

(56) References Cited

U.S. PATENT DOCUMENTS

| | | |
|---|---|---|
| 9,807,619 B2 | 10/2017 | Tsai et al. |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,958,541 B2 | 5/2018 | Kishigami et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,027,923 B1 | 7/2018 | Chang |
| 10,034,630 B2 | 7/2018 | Lee et al. |
| 10,063,427 B1 | 8/2018 | Brown |
| 10,064,582 B2 | 9/2018 | Rogers |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,405 B2 | 2/2019 | Mazzaro et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,304,567 B2 | 5/2019 | Kitagawa et al. |
| 10,310,620 B2 | 6/2019 | Lien et al. |
| 10,310,621 B1 | 6/2019 | Lien et al. |
| 10,376,195 B1 | 8/2019 | Reid et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 10,540,001 B1 | 1/2020 | Poupyrev et al. |
| 10,572,027 B2 | 2/2020 | Poupyrev et al. |
| 10,579,150 B2 | 3/2020 | Gu et al. |
| 10,642,367 B2 | 5/2020 | Poupyrev |
| 10,660,379 B2 | 5/2020 | Poupyrev et al. |
| 10,664,059 B2 | 5/2020 | Poupyrev |
| 10,664,061 B2 | 5/2020 | Poupyrev |
| 10,705,185 B1 | 7/2020 | Lien et al. |
| 10,768,712 B2 | 9/2020 | Schwesig et al. |
| 10,817,065 B1 | 10/2020 | Lien et al. |
| 10,817,070 B2 | 10/2020 | Lien et al. |
| 10,823,841 B1 | 11/2020 | Lien et al. |
| 10,908,696 B2 | 2/2021 | Amihood et al. |
| 10,931,934 B2 | 2/2021 | Richards et al. |
| 10,936,081 B2 | 3/2021 | Poupyrev |
| 10,936,085 B2 | 3/2021 | Poupyrev et al. |
| 10,948,996 B2 | 3/2021 | Poupyrev et al. |
| 11,080,556 B1 | 8/2021 | Gillian et al. |
| 11,103,015 B2 | 8/2021 | Poupyrev et al. |
| 11,132,065 B2 | 9/2021 | Gillian et al. |
| 11,140,787 B2 | 10/2021 | Karagozler et al. |
| 11,169,988 B2 | 11/2021 | Poupyrev et al. |
| 11,175,743 B2 | 11/2021 | Lien et al. |
| 2001/0030624 A1 | 10/2001 | Schwoegler |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0036685 A1 | 2/2003 | Goodman |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0008137 A1 | 1/2004 | Hassebrock et al. |
| 2004/0009729 A1 | 1/2004 | Hill et al. |
| 2004/0046736 A1 | 3/2004 | Pryor et al. |
| 2004/0102693 A1 | 5/2004 | Jenkins |
| 2004/0157662 A1 | 8/2004 | Tsuchiya |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0183980 A1 | 8/2006 | Yang |
| 2006/0209021 A1 | 9/2006 | Yoo et al. |
| 2006/0244654 A1 | 11/2006 | Cheng et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0024946 A1 | 2/2007 | Panasyuk et al. |
| 2007/0026695 A1 | 2/2007 | Lee et al. |
| 2007/0027369 A1 | 2/2007 | Pagnacco et al. |
| 2007/0030195 A1 | 2/2007 | Steinway et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2007/0276262 A1 | 11/2007 | Banet et al. |
| 2007/0276632 A1 | 11/2007 | Banet et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0122796 A1 | 5/2008 | Jobs et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0168403 A1 | 7/2008 | Westerman et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0002220 A1 | 1/2009 | Lovberg et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |

(56) References Cited

U.S. PATENT DOCUMENTS

| | | |
|---|---|---|
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0292468 A1 | 11/2009 | Wu et al. |
| 2009/0295712 A1 | 12/2009 | Ritzau |
| 2009/0299197 A1 | 12/2009 | Antonelli et al. |
| 2009/0303100 A1 | 12/2009 | Zemany |
| 2009/0319181 A1 | 12/2009 | Khosravy et al. |
| 2010/0013676 A1 | 1/2010 | Do et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0107099 A1 | 4/2010 | Frazier et al. |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 * | 7/2011 | Rautiainen ............... G06F 3/017 345/158 |
| 2011/0181510 A1 * | 7/2011 | Hakala .................... G06F 3/017 345/158 |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0069043 A1 | 3/2012 | Narita et al. |
| 2012/0075958 A1 | 3/2012 | Hintz |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0191223 A1 | 7/2012 | Dharwada et al. |
| 2012/0193801 A1 | 8/2012 | Gross et al. |
| 2012/0200600 A1 | 8/2012 | Demaine |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268310 A1 | 10/2012 | Kim |
| 2012/0268416 A1 | 10/2012 | Pirogov et al. |
| 2012/0270564 A1 | 10/2012 | Gum et al. |
| 2012/0276849 A1 | 11/2012 | Hyde et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0076649 A1 | 3/2013 | Myers et al. |
| 2013/0076788 A1 | 3/2013 | Ben Zvi |
| 2013/0078624 A1 | 3/2013 | Holmes et al. |
| 2013/0079649 A1 | 3/2013 | Mestha et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0176258 A1 | 7/2013 | Dahl et al. |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0222232 A1 | 8/2013 | Kong et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0310700 A1 | 11/2013 | Wiard et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |

(56) References Cited

U.S. PATENT DOCUMENTS

| | | |
|---|---|---|
| 2014/0035737 A1 | 2/2014 | Rashid et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139430 A1 | 5/2014 | Leung |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0149859 A1 | 5/2014 | Van Dyken et al. |
| 2014/0181509 A1 | 6/2014 | Liu |
| 2014/0184496 A1 | 7/2014 | Gribetz et al. |
| 2014/0184499 A1 | 7/2014 | Kim |
| 2014/0188989 A1 | 7/2014 | Stekkelpak et al. |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0203080 A1 | 7/2014 | Hintz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0265642 A1 | 9/2014 | Utley et al. |
| 2014/0270698 A1 | 9/2014 | Luna et al. |
| 2014/0275854 A1 | 9/2014 | Venkatraman et al. |
| 2014/0276104 A1 | 9/2014 | Tao et al. |
| 2014/0280295 A1 | 9/2014 | Kurochkin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0077345 A1 | 3/2015 | Hwang et al. |
| 2015/0084855 A1 | 3/2015 | Song et al. |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversal et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0204973 A1 | 7/2015 | Nohara et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0257653 A1 | 9/2015 | Hyde et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0276925 A1 | 10/2015 | Scholten et al. |
| 2015/0277569 A1* | 10/2015 | Sprenger ............... G06F 3/017 345/156 |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0297105 A1 | 10/2015 | Pahlevan et al. |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346701 A1 | 12/2015 | Gordon et al. |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0026768 A1 | 1/2016 | Singh et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0045706 A1 | 2/2016 | Gary et al. |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0075015 A1 | 3/2016 | Izhikevich et al. |
| 2016/0075016 A1 | 3/2016 | Laurent et al. |
| 2016/0077202 A1 | 3/2016 | Hirvonen et al. |
| 2016/0085296 A1 | 3/2016 | Mo et al. |
| 2016/0089042 A1 | 3/2016 | Saponas et al. |
| 2016/0090839 A1 | 3/2016 | Stolarcyzk |
| 2016/0096270 A1 | 4/2016 | Ibarz Gabardos et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0124579 A1 | 5/2016 | Tokutake |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |

(56) References Cited

U.S. PATENT DOCUMENTS

| | | |
|---|---|---|
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0234365 A1 | 8/2016 | Alameh et al. |
| 2016/0238696 A1 | 8/2016 | Hintz |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0291143 A1 | 10/2016 | Cao et al. |
| 2016/0299526 A1 | 10/2016 | Inagaki et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0013417 A1 | 1/2017 | Zampini, II |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0164904 A1 | 6/2017 | Kirenko |
| 2017/0168630 A1 | 6/2017 | Khoshkava et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0224280 A1 | 8/2017 | Bozkurt et al. |
| 2017/0231089 A1 | 8/2017 | Van Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0258366 A1 | 9/2017 | Tupin et al. |
| 2017/0291301 A1 | 10/2017 | Gabardos et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2017/0356992 A1 | 12/2017 | Scholten et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0030713 A1 | 1/2019 | Gabardos et al. |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0321719 A1 | 10/2019 | Gillian et al. |
| 2019/0391667 A1 | 12/2019 | Poupyrev |
| 2019/0394884 A1 | 12/2019 | Karagozler et al. |
| 2020/0064471 A1 | 2/2020 | Gatland et al. |
| 2020/0064924 A1 | 2/2020 | Poupyrev et al. |
| 2020/0089314 A1 | 3/2020 | Poupyrev et al. |
| 2020/0150776 A1 | 5/2020 | Poupyrev et al. |
| 2020/0218361 A1 | 7/2020 | Poupyrev |
| 2020/0229515 A1 | 7/2020 | Poupyrev et al. |
| 2020/0264765 A1 | 8/2020 | Poupyrev et al. |
| 2020/0278422 A1 | 9/2020 | Lien et al. |
| 2020/0326708 A1 | 10/2020 | Wang et al. |
| 2020/0393912 A1 | 12/2020 | Lien et al. |
| 2020/0409472 A1 | 12/2020 | Lien et al. |
| 2021/0096653 A1 | 4/2021 | Amihood et al. |
| 2021/0326642 A1 | 10/2021 | Gillian et al. |
| 2021/0365124 A1 | 11/2021 | Gillian et al. |

FOREIGN PATENT DOCUMENTS

| | | |
|---|---|---|
| CN | 101349943 | 1/2009 |
| CN | 101636711 | 1/2010 |
| CN | 101751126 | 6/2010 |
| CN | 101910781 | 12/2010 |
| CN | 102031615 | 4/2011 |
| CN | 102160471 | 8/2011 |
| CN | 102184020 | 9/2011 |
| CN | 102414641 | 4/2012 |
| CN | 102473032 | 5/2012 |
| CN | 102782612 | 11/2012 |
| CN | 102819315 | 12/2012 |
| CN | 102893327 | 1/2013 |
| CN | 106342197 | 2/2013 |
| CN | 202887794 | 4/2013 |
| CN | 103076911 | 5/2013 |
| CN | 103091667 | 5/2013 |
| CN | 103502911 | 1/2014 |
| CN | 103534664 | 1/2014 |
| CN | 102660988 | 3/2014 |
| CN | 103675868 | 3/2014 |
| CN | 103907405 | 7/2014 |
| CN | 104035552 | 9/2014 |
| CN | 104094194 | 10/2014 |
| CN | 104115118 | 10/2014 |
| CN | 104838336 | 8/2015 |
| CN | 103355860 | 1/2016 |
| CN | 106154270 | 11/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2177017 | 4/2010 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 2923642 | 3/2017 |
| EP | 3201726 | 8/2017 |
| FR | 3017722 | 8/2015 |
| GB | 2070469 | 9/1981 |
| GB | 2443208 | 4/2008 |
| GN | 1299501 | 6/2001 |
| JP | 113860 | 4/1999 |
| JP | 11168268 | 6/1999 |
| JP | H11168268 | 6/1999 |
| JP | 2003500759 | 1/2003 |
| JP | 2003280049 | 10/2003 |
| JP | 2006163886 | 6/2006 |
| JP | 2006234716 | 9/2006 |

(56) References Cited

FOREIGN PATENT DOCUMENTS

| | | |
|---|---|---|
| JP | 2007011873 | 1/2007 |
| JP | 2007132768 | 5/2007 |
| JP | 2007266772 | 10/2007 |
| JP | 2008287714 | 11/2008 |
| JP | 2008293501 | 12/2008 |
| JP | 2009037434 | 2/2009 |
| JP | 2010048583 | 3/2010 |
| JP | 2010049583 | 3/2010 |
| JP | 2011003202 | 1/2011 |
| JP | 2011086114 | 4/2011 |
| JP | 2011102457 | 5/2011 |
| JP | 2012068854 | 4/2012 |
| JP | 201218583 | 9/2012 |
| JP | 2012185833 | 9/2012 |
| JP | 2012198916 | 10/2012 |
| JP | 2012208714 | 10/2012 |
| JP | 2013016060 | 1/2013 |
| JP | 2013037674 | 2/2013 |
| JP | 2013196047 | 9/2013 |
| JP | 2013251913 | 12/2013 |
| JP | 2014503873 | 2/2014 |
| JP | 2014532332 | 12/2014 |
| JP | 2015507263 | 3/2015 |
| JP | 2015509634 | 3/2015 |
| KR | 1020080102516 | 11/2008 |
| KR | 100987650 | 10/2010 |
| KR | 20130045222 | 5/2013 |
| KR | 1020130137005 | 12/2013 |
| KR | 20140027837 | 3/2014 |
| KR | 20140053988 | 5/2014 |
| KR | 1020140055985 | 5/2014 |
| KR | 101999712 | 1/2017 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005033387 | 4/2005 |
| WO | 2005103863 | 11/2005 |
| WO | 2007125298 | 11/2007 |
| WO | 2008061385 | 5/2008 |
| WO | 2009032073 | 3/2009 |
| WO | 2009083467 | 7/2009 |
| WO | 2009148064 | 12/2009 |
| WO | 2010032173 | 3/2010 |
| WO | 2010101697 | 9/2010 |
| WO | 2012026013 | 3/2012 |
| WO | 2012064847 | 5/2012 |
| WO | 2012152476 | 11/2012 |
| WO | 2013082806 | 6/2013 |
| WO | 2013084108 | 6/2013 |
| WO | 2013137412 | 9/2013 |
| WO | 2013154864 | 10/2013 |
| WO | 2013186696 | 12/2013 |
| WO | 2013191657 | 12/2013 |
| WO | 2013192166 | 12/2013 |
| WO | 2014019085 | 2/2014 |
| WO | 2014032984 | 3/2014 |
| WO | 2014085369 | 6/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015018675 | 2/2015 |
| WO | 2015022671 | 2/2015 |
| WO | 2015099796 | 7/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 2017200570 | 11/2017 |
| WO | 2017200571 | 11/2017 |
| WO | 20170200949 | 11/2017 |
| WO | 2018106306 | 6/2018 |

OTHER PUBLICATIONS

"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 on Nov. 10, 2017; The Verge, paragraph 1, Sep. 9, 2014, 4 pages.

"Cardiio", Retrieved From: <http://www.cardiio.com/> Apr. 15, 2015 App Information Retrieved From: <https://itunes.apple.com/US/app/cardiio-touchless-camera-pulse/id542891434?ls=1&mt=8> Apr. 15, 2015, Feb. 24, 2015, 6 pages.

"Clever Toilet Checks on Your Health", CNN.Com; Technology, Jun. 28, 2005, 2 pages.

"Combined Search and Examination Report", GB Application No. 1620892.8, dated Apr. 6, 2017, 5 pages.

"Combined Search and Examination Report", GB Application No. 1620891.0, dated May 31, 2017, 9 pages.

"Corrected Notice of Allowance", U.S. Appl. No. 15/362,359, dated Sep. 17, 2018, 10 pages.

"Corrected Notice of Allowance", U.S. Appl. No. 16/380,245, dated Jan. 6, 2021, 2 pages.

"Corrected Notice of Allowance", U.S. Appl. No. 16/252,477, dated Sep. 30, 2020, 2 pages.

"Corrected Notice of Allowance", U.S. Appl. No. 16/380,245, dated Jan. 15, 2020, 2 pages.

"Corrected Notice of Allowance", U.S. Appl. No. 16/560,085, dated Dec. 14, 2020, 2 pages.

"Corrected Notice of Allowance", U.S. Appl. No. 16/380,245, dated Dec. 18, 2020, 2 pages.

"Corrected Notice of Allowance", U.S. Appl. No. 14/582,896, dated Dec. 19, 2016, 2 pages.

"Corrected Notice of Allowance", U.S. Appl. No. 14/504,061, dated Dec. 27, 2016, 2 pages.

"Corrected Notice of Allowance", U.S. Appl. No. 14/582,896, dated Feb. 6, 2017, 2 pages.

"Corrected Notice of Allowance", U.S. Appl. No. 14/582,896, dated Feb. 23, 2017, 2 pages.

"Corrected Notice of Allowance", U.S. Appl. No. 14/930,220, dated Mar. 20, 2017, 2 pages.

"Corrected Notice of Allowance", U.S. Appl. No. 14/930,220, dated May 11, 2017, 2 pages.

"Corrected Notice of Allowance", U.S. Appl. No. 14/312,486, dated Oct. 28, 2016, 4 pages.

"Corrected Notice of Allowance", U.S. Appl. No. 14/312,486, dated Jan. 23, 2017, 4 pages.

"EP Appeal Decision", European Application No. 10194359.5, dated May 28, 2019, 20 pages.

"European Search Report", European Application No. 16789735.4, dated Nov. 14, 2018, 4 pages.

"Extended European Search Report", European Application No. 19164113.3, dated Jun. 13, 2019, 11 pages.

"Extended European Search Report", EP Application No. 15170577.9, dated Nov. 5, 2015, 12 pages.

"Extended European Search Report", European Application No. 19158625.4, dated May 8, 2019, 16 pages.

"Extended European Search Report", European Application No. 20174555.1, dated Oct. 13, 2020, 9 pages.

(56) References Cited

OTHER PUBLICATIONS

"Final Office Action", U.S. Appl. No. 15/462,957, dated Nov. 8, 2019, 10 Pages.
"Final Office Action", U.S. Appl. No. 14/504,061, dated Mar. 9, 2016, 10 pages.
"Final Office Action", U.S. Appl. No. 14/681,625, dated Dec. 7, 2016, 10 pages.
"Final Office Action", U.S. Appl. No. 15/287,253, dated Apr. 2, 2019, 10 pages.
"Final Office Action", U.S. Appl. No. 15/398,147, dated Jun. 30, 2017, 11 pages.
"Final Office Action", U.S. Appl. No. 15/287,155, dated Apr. 10, 2019, 11 pages.
"Final Office Action", U.S. Appl. No. 14/959,799, dated Jul. 19, 2017, 12 pages.
"Final Office Action", U.S. Appl. No. 14/731,195, dated Oct. 11, 2018, 12 pages.
"Final Office Action", U.S. Appl. No. 15/595,649, dated May 23, 2018, 13 pages.
"Final Office Action", U.S. Appl. No. 14/715,454, dated Sep. 7, 2017, 14 pages.
"Final Office Action", U.S. Appl. No. 16/503,234, dated Dec. 30, 2020, 14 pages.
"Final Office Action", U.S. Appl. No. 14/504,139, dated May 1, 2018, 14 pages.
"Final Office Action", U.S. Appl. No. 15/286,512, dated Dec. 26, 2018, 15 pages.
"Final Office Action", U.S. Appl. No. 15/142,619, dated Feb. 8, 2018, 15 pages.
"Final Office Action", U.S. Appl. No. 16/238,464, dated Jul. 25, 2019, 15 pages.
"Final Office Action", U.S. Appl. No. 15/287,359, dated Feb. 19, 2020, 16 Pages.
"Final Office Action", U.S. Appl. No. 14/504,121, dated Aug. 8, 2017, 16 pages.
"Final Office Action", U.S. Appl. No. 14/959,730, dated Nov. 22, 2017, 16 pages.
"Final Office Action", U.S. Appl. No. 15/142,689, dated Jun. 1, 2018, 16 pages.
"Final Office Action", U.S. Appl. No. 14/959,799, dated Jan. 4, 2018, 17 pages.
"Final Office Action", U.S. Appl. No. 14/720,632, dated Jan. 9, 2018, 18 pages.
"Final Office Action", U.S. Appl. No. 15/704,825, dated Nov. 23, 2020, 18 pages.
"Final Office Action", U.S. Appl. No. 14/518,863, dated May 5, 2017, 18 pages.
"Final Office Action", U.S. Appl. No. 14/959,901, dated May 30, 2019, 18 pages.
"Final Office Action", U.S. Appl. No. 14/959,901, dated Aug. 25, 2017, 19 pages.
"Final Office Action", U.S. Appl. No. 15/093,533, dated Mar. 21, 2018, 19 pages.
"Final Office Action", U.S. Appl. No. 14/715,454, dated Apr. 17, 2018, 19 pages.
"Final Office Action", U.S. Appl. No. 15/286,537, dated Apr. 19, 2019, 21 pages.
"Final Office Action", U.S. Appl. No. 14/518,863, dated Apr. 5, 2018, 21 pages.
"Final Office Action", U.S. Appl. No. 15/596,702, dated Jun. 13, 2019, 21 pages.
"Final Office Action", U.S. Appl. No. 14/959,901, dated Jun. 15, 2018, 21 pages.
"Final Office Action", U.S. Appl. No. 15/287,308, dated Feb. 8, 2019, 23 pages.
"Final Office Action", U.S. Appl. No. 14/599,954, dated Aug. 10, 2016, 23 pages.
"Final Office Action", U.S. Appl. No. 14/504,038, dated Sep. 27, 2016, 23 pages.
"Final Office Action", U.S. Appl. No. 14/504,121, dated Jul. 9, 2018, 23 pages.
"Final Office Action", U.S. Appl. No. 15/286,152, dated Jun. 26, 2018, 25 pages.
"Final Office Action", U.S. Appl. No. 15/704,615, dated Dec. 11, 2020, 26 pages.
"Final Office Action", U.S. Appl. No. 15/142,471, dated Jun. 20, 2019, 26 pages.
"Final Office Action", U.S. Appl. No. 15/596,702, 27 Pages.
"Final Office Action", U.S. Appl. No. 15/403,066, dated Oct. 5, 2017, 31 pages.
"Final Office Action", U.S. Appl. No. 15/267,181, dated Jun. 7, 2018, 31 pages.
"Final Office Action", U.S. Appl. No. 14/312,486, dated Jun. 3, 2016, 32 pages.
"Final Office Action", U.S. Appl. No. 15/166,198, dated Sep. 27, 2018, 33 pages.
"Final Office Action", U.S. Appl. No. 15/287,394, dated Sep. 30, 2019, 38 Pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"Final Office Action", Korean Application No. 10-2016-7036023, dated Feb. 19, 2018, 8 pages.
"Final Office Action", U.S. Appl. No. 14/874,955, dated Jun. 30, 2017, 9 pages.
"Final Office Action", U.S. Appl. No. 14/874,955, dated Jun. 11, 2018, 9 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 16/080,293, dated Jul. 23, 2020, 3 Pages.
"First Action Interview Office Action", U.S. Appl. No. 14/959,901, dated Apr. 14, 2017, 3 pages.
"First Action Interview Office Action", U.S. Appl. No. 14/731,195, dated Jun. 21, 2018, 4 pages.
"First Action Interview Office Action", U.S. Appl. No. 15/286,152, dated Mar. 1, 2018, 5 pages.
"First Action Interview Office Action", U.S. Appl. No. 15/917,238, dated Jun. 6, 2019, 6 pages.
"First Action Interview Office Action", U.S. Appl. No. 15/166,198, dated Apr. 25, 2018, 8 pages.
"First Action Interview Pilot Program Pre-Interview Communication", U.S. Appl. No. 14/731,195, dated Aug. 1, 2017, 3 pages.
"First Exam Report", EP Application No. 15754352.1, dated Mar. 5, 2018, 7 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", Korean Application No. 1020187029464, dated Oct. 30, 2018, 1 page.
"Foreign Office Action", KR Application No. 10-2016-7036023, dated Aug. 11, 2017, 10 pages.
"Foreign Office Action", CN Application No. 201680020123.9, dated Nov. 29, 2019, 10 pages.
"Foreign Office Action", Chinese Application No. 201580034908.7, dated Feb. 19, 2019, 10 pages.
"Foreign Office Action", Chinese Application No. 201611159602.7, dated Jul. 23, 2020, 10 pages.
"Foreign Office Action", Chinese Application No. 201611191179.9, dated Aug. 28, 2019, 10 pages.
"Foreign Office Action", CN Application No. 201710922856.8, dated Jun. 19, 2020, 11 pages.
"Foreign Office Action", Japanese Application No. 2018-501256, dated Jul. 24, 2018, 11 pages.
"Foreign Office Action", JP Application No. 2019-078554, dated Jul. 21, 2020, 12 pages.

(56) References Cited

OTHER PUBLICATIONS

"Foreign Office Action", Chinese Application No. 201580036075.8, dated Jul. 4, 2018, 14 page.
"Foreign Office Action", European Application No. 16725269.1, dated Nov. 26, 2018, 14 pages.
"Foreign Office Action", Chinese Application No. 201680021212.5, dated Sep. 3, 2019, 14 pages.
"Foreign Office Action", JP Application No. 2016-563979, dated Sep. 21, 2017, 15 pages.
"Foreign Office Action", Japanese Application No. 1020187027694, dated Nov. 23, 2018, 15 pages.
"Foreign Office Action", Chinese Application No. 201611159870.9, dated Dec. 17, 2019, 15 pages.
"Foreign Office Action", European Application No. 16725269.1, dated Mar. 24, 2020, 15 pages.
"Foreign Office Action", CN Application No. 201580034908.7, dated Jul. 3, 2018, 17 pages.
"Foreign Office Action", Chinese Application No. 201510300495.4, dated Jun. 21, 2018, 18 pages.
"Foreign Office Action", Chinese Application No. 201680020567.2, dated Sep. 26, 2019, 19 pages.
"Foreign Office Action", Korean Application No. 1020197004803, dated Oct. 14, 2019, 2 pages.
"Foreign Office Action", Korean Application No. 1020197004803, dated Dec. 6, 2019, 2 pages.
"Foreign Office Action", Chinese Application No. 201721290290.3, dated Mar. 9, 2018, 2 pages.
"Foreign Office Action", Chinese Application No. 201611159602.7, dated Oct. 11, 2019, 20 pages.
"Foreign Office Action", Chinese Application No. 201580035246.5, dated Jan. 31, 2019, 22 pages.
"Foreign Office Action", Chinese Application No. 201680021213.X, dated Oct. 28, 2019, 26 pages.
"Foreign Office Action", CN Application No. 201680038897.4, dated Jun. 29, 2020, 28 pages.
"Foreign Office Action", Japanese Application No. 2018156138, dated May 22, 2019, 3 pages.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", British Application No. 1621332.4, dated Nov. 6, 2019, 3 pages.
"Foreign Office Action", Japanese Application No. 2018501256, dated Feb. 26, 2019, 3 pages.
"Foreign Office Action", Japanese Application No. 2018156138, dated Apr. 22, 2020, 3 pages.
"Foreign Office Action", Japanese Application No. 2016-567839, dated Apr. 3, 2018, 3 pages.
"Foreign Office Action", Japanese Application No. 2018-021296, dated Apr. 9, 2019, 3 pages.
"Foreign Office Action", European Application No. 16784352.3, dated May 16, 2018, 3 pages.
"Foreign Office Action", Japanese Application No. 2016-563979, May 21, 2018, 3 pages.
"Foreign Office Action", Chinese Application No. 201721290290.3, dated Jun. 6, 2018, 3 pages.
"Foreign Office Action", Japanese Application No. 2018156138, dated Sep. 30, 2019, 3 pages.
"Foreign Office Action", European Application No. 15170577.9, dated Dec. 21, 2018, 31 pages.
"Foreign Office Action", Japanese Application No. 2016-575564, dated Jan. 10, 2019, 4 pages.
"Foreign Office Action", GB Application No. 1621191.4, dated Dec. 31, 2020, 4 pages.
"Foreign Office Action", Korean Application No. 10-2016-7036023, dated Apr. 12, 2018, 4 pages.
"Foreign Office Action", Japanese Application No. 2016-575564, dated Jul. 10, 2018, 4 pages.
"Foreign Office Action", GB Application No. 1621192.2, dated Jun. 17, 2020, 5 pages.
"Foreign Office Action", KR Application No. 10-2016-7035397, dated Sep. 20, 2017, 5 pages.
"Foreign Office Action", Japanese Application No. 2018169008, dated Jan. 14, 2020, 5 pages.
"Foreign Office Action", Japanese Application No. 2018501256, dated Oct. 23, 2019, 5 pages.
"Foreign Office Action", Korean Application No. 10-2017-7027877, dated Nov. 23, 2018, 5 pages.
"Foreign Office Action", Japanese Application No. 2017-541972, dated Nov. 27, 2018, 5 pages.
"Foreign Office Action", European Application No. 15754352.1, dated Nov. 7, 2018, 5 pages.
"Foreign Office Action", European Application No. 16789735.4, dated Dec. 12, 2018, 5 pages.
"Foreign Office Action", Japanese Application No. 2016-575564, dated Dec. 5, 2017, 5 pages.
"Foreign Office Action", UK Application No. 1620891.0, dated Dec. 6, 2018, 5 pages.
"Foreign Office Action", Chinese Application No. 201580036075.8, dated Feb. 19, 2019, 5 pages.
"Foreign Office Action", Japanese Application No. 2016-563979, dated Feb. 7, 2018, 5 pages.
"Foreign Office Action", KR Application No. 1020187004283, dated Sep. 11, 2020, 5 pages.
"Foreign Office Action", British Application No. 1912334.8, dated Sep. 23, 2019, 5 pages.
"Foreign Office Action", Korean Application No. 1020197019768, dated Sep. 30, 2019, 6 pages.
"Foreign Office Action", Korean Application No. 10-2017-7027871, dated Nov. 23, 2018, 6 pages.
"Foreign Office Action", Chinese Application No. 201510300495.4, dated Apr. 10, 2019, 6 pages.
"Foreign Office Action", Korean Application No. 1020197004803, dated Apr. 26, 2019, 6 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 1020197023675, dated Jul. 13, 2020, 7 pages.
"Foreign Office Action", KR Application No. 2019-7020454, dated Aug. 26, 2020, 7 pages.
"Foreign Office Action", Korean Application No. 10-2016-7036396, dated Jan. 3, 2018, 7 pages.
"Foreign Office Action", European Application No. 16716351.8, dated Mar. 15, 2019, 7 pages.
"Foreign Office Action", Chinese Application No. 201680021213.X, dated Aug. 27, 2020, 7 pages.
"Foreign Office Action", IN Application No. 201747044162, dated Sep. 3, 2020, 7 pages.
"Foreign Office Action", JP Application No. 2016567813, dated Sep. 22, 2017, 8 pages.
"Foreign Office Action", Korean Application No. 1020187004283, dated Jan. 3, 2020, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action", European Application No. 16724775.8, dated Nov. 23, 2018, 9 pages.
"Foreign Office Action", DE Application No. 102016014611.7, dated Sep. 28, 2020, 9 pages.
"Foreign Office Action", KR Application No. 10-2016-7032967, English Translation, dated Sep. 14, 2017, 4 pages.
"Frogpad Introduces Wearable Fabric Keyboard with Bluetooth Technology", Retrieved From: http://www.geekzone.co.nz/content.asp?contentid=3898> Mar. 16, 2015, Jan. 7, 2005, 2 pages.
"Galaxy S4 Air Gesture", Galaxy S4 Guides, retrieved from https://allaboutgalaxys4.com/galaxy-s4-features-explained/air-gesture/ on Sep. 3, 19, 4 pages.

(56) References Cited

OTHER PUBLICATIONS

"International Preliminary Report on Patentability", PCT Application No. PCT/US2017/051663, dated Jun. 20, 2019, 10 pages.
"International Preliminary Report on Patentability", PCT Application No. PCT/US2016/063874, dated Nov. 29, 2018, 12 pages.
"International Preliminary Report on Patentability", Application No. PCT/US2015/030388, dated Dec. 15, 2016, 12 pages.
"International Preliminary Report on Patentability", Application No. PCT/US2015/043963, dated Feb. 16, 2017, 12 pages.
"International Preliminary Report on Patentability", Application No. PCT/US2015/050903, dateadp Apr. 13, 2017, 12 pages.
"International Preliminary Report on Patentability", Application No. PCT/US2015/043949, dated Feb. 16, 2017, 13 pages.
"International Preliminary Report on Patentability", PCT Application No. PCT/US2017/032733, dated Nov. 29, 2018, 7 pages.
"International Preliminary Report on Patentability", PCT Application No. PCT/US2016/026756, dated Oct. 19, 2017, 8 pages.
"International Preliminary Report on Patentability", Application No. PCT/US2015/044774, dated Mar. 2, 2017, 8 pages.
"International Search Report and Written Opinion", Application No. PCT/US2016/060399, dated Jan. 30, 2017, 11 pages.
"International Search Report and Written Opinion", PCT Application No. PCT/US2016/065295, dated Mar. 14, 2017, 12 pages.
"International Search Report and Written Opinion", Application No. PCT/US2015/044774, dated Nov. 3, 2015, 12 pages.
"International Search Report and Written Opinion", Application No. PCT/US2016/042013, dated Oct. 26, 2016, 12 pages.
"International Search Report and Written Opinion", Application No. PCT/US2016/062082, dated Feb. 23, 2017, 12 pages.
"International Search Report and Written Opinion", PCT/US2017/047691, dated Nov. 16, 2017, 13 pages.
"International Search Report and Written Opinion", Application No. PCT/US2016/024267, dated Jun. 20, 2016, 13 pages.
"International Search Report and Written Opinion", Application No. PCT/US2016/024273, Jun. 20, 2016, 13 pages.
"International Search Report and Written Opinion", Application No. PCT/US2016/032307, dated Aug. 2, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/055671, dated Dec. 1, 2016, 14 pages.
"International Search Report and Written Opinion", Application No. PCT/US2016/030177, dated Aug. 2, 2016, 15 pages.
"International Search Report and Written Opinion", PCT Application No. PCT/US2017/051663, dated Nov. 29, 2017, 16 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/043949, dated Dec. 1, 2015, 18 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2016/063874, dated May 11, 2017, 19 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex>, Feb. 3, 2017, 2 pages.
"Non-Final Office Action", U.S. Appl. No. 15/596,702, dated Jan. 4, 2019, 10 pages.
"Non-Final Office Action", U.S. Appl. No. 16/153,395, dated Oct. 22, 2019, 10 Pages.
"Non-Final Office Action", U.S. Appl. No. 15/286,837, dated Oct. 26, 2018, 10 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Non-Final Office Action", U.S. Appl. No. 14/504,139, dated Oct. 18, 2017, 12 pages.
"Non-Final Office Action", U.S. Appl. No. 15/287,155, dated Dec. 10, 2018, 12 pages.
"Non-Final Office Action", U.S. Appl. No. 14/666,155, dated Feb. 3, 2017, 12 pages.
"Non-Final Office Action", U.S. Appl. No. 15/424,263, dated May 23, 2019, 12 pages.
"Non-Final Office Action", U.S. Appl. No. 16/669,842, dated Sep. 3, 2020, 12 pages.
"Non-Final Office Action", U.S. Appl. No. 16/252,477, dated Jan. 10, 2020, 13 Pages.
"Non-Final Office Action", U.S. Appl. No. 14/504,121, dated Jan. 9, 2017, 13 pages.
"Non-Final Office Action", U.S. Appl. No. 14/809,901, dated May 24, 2018, 13 pages.
"Non-Final Office Action", U.S. Appl. No. 14/959,730, dated Jun. 23, 2017, 14 pages.
"Non-Final Office Action", U.S. Appl. No. 15/462,957, dated May 24, 2019, 14 pages.
"Non-Final Office Action", U.S. Appl. No. 14/862,409, dated Jun. 22, 2017, 15 pages.
"Non-Final Office Action", U.S. Appl. No. 14/930,220, dated Sep. 14, 2016, 15 pages.
"Non-Final Office Action", U.S. Appl. No. 16/238,464, dated Mar. 7, 2019, 15 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Non-Final Office Action", U.S. Appl. No. 14/720,632, dated Jun. 14, 2017, 16 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 14/715,454, dated Jan. 11, 2018, 16 pages.
"Non-Final Office Action", U.S. Appl. No. 15/595,649, dated Oct. 31, 2017, 16 pages.
"Non-Final Office Action", U.S. Appl. No. 14/504,139, dated Oct. 5, 2018, 16 pages.
"Non-Final Office Action", U.S. Appl. No. 15/976,518, dated Nov. 25, 2020, 16 pages.
"Non-Final Office Action", U.S. Appl. No. 14/518,863, dated Oct. 14, 2016, 16 pages.
"Non-Final Office Action", U.S. Appl. No. 14/599,954, dated Jan. 26, 2017, 16 pages.
"Non-Final Office Action", U.S. Appl. No. 14/862,409, dated Dec. 14, 2017, 17 pages.
"Non-Final Office Action", U.S. Appl. No. 14/599,954, dated Feb. 2, 2016, 17 pages.
"Non-Final Office Action", U.S. Appl. No. 15/287,253, dated Apr. 5, 2018, 17 pages.
"Non-Final Office Action", U.S. Appl. No. 16/503,234, dated Aug. 5, 2020, 18 Pages.
"Non-Final Office Action", U.S. Appl. No. 15/093,533, dated Aug. 24, 2017, 18 pages.
"Non-Final Office Action", U.S. Appl. No. 15/142,689, dated Oct. 4, 2017, 18 pages.
"Non-Final Office Action", U.S. Appl. No. 15/287,308, dated Oct. 15, 2018, 18 pages.
"Non-Final Office Action", U.S. Appl. No. 15/286,537, dated Nov. 19, 2018, 18 pages.
"Non-Final Office Action", U.S. Appl. No. 15/287,359, dated Jun. 26, 2020, 19 Pages.

(56) References Cited

OTHER PUBLICATIONS

"Non-Final Office Action", U.S. Appl. No. 14/504,121, dated Jan. 2, 2018, 19 pages.
"Non-Final Office Action", U.S. Appl. No. 15/287,359, dated Oct. 28, 2020, 19 pages.
"Non-Final Office Action", U.S. Appl. No. 15/287,253, dated Sep. 7, 2018, 20 pages.
"Non-Final Office Action", U.S. Appl. No. 14/518,863, dated Sep. 29, 2017, 20 pages.
"Non-Final Office Action", U.S. Appl. No. 14/720,632, dated May 18, 2018, 20 pages.
"Non-Final Office Action", U.S. Appl. No. 14/959,901, dated Jan. 8, 2018, 21 pages.
"Non-Final Office Action", U.S. Appl. No. 15/596,702, dated Oct. 21, 2019, 21 Pages.
"Non-Final Office Action", U.S. Appl. No. 15/704,825, dated Jun. 1, 2020, 22 Pages.
"Non-Final Office Action", U.S. Appl. No. 15/791,044, dated Sep. 30, 2019, 22 Pages.
"Non-Final Office Action", U.S. Appl. No. 14/959,901, dated Oct. 11, 2018, 22 pages.
"Non-Final Office Action", U.S. Appl. No. 16/689,519, dated Oct. 20, 2020, 22 pages.
"Non-Final Office Action", U.S. Appl. No. 14/504,038, dated Feb. 26, 2016, 22 pages.
"Non-Final Office Action", U.S. Appl. No. 14/312,486, dated Oct. 23, 2015, 25 pages.
"Non-Final Office Action", U.S. Appl. No. 15/596,702, dated Aug. 19, 2020, 27 Pages.
"Non-Final Office Action", U.S. Appl. No. 15/286,152, dated Oct. 19, 2018, 27 pages.
"Non-Final Office Action", U.S. Appl. No. 15/286,537, dated Sep. 3, 2019, 28 Pages.
"Non-Final Office Action", U.S. Appl. No. 15/704,615, dated Jun. 1, 2020, 29 Pages.
"Non-Final Office Action", U.S. Appl. No. 15/267,181, dated Feb. 8, 2018, 29 pages.
"Non-Final Office Action", U.S. Appl. No. 15/403,066, dated May 4, 2017, 31 pages.
"Non-Final Office Action", U.S. Appl. No. 14/699,181, dated Oct. 18, 2017, 33 pages.
"Non-Final Office Action", U.S. Appl. No. 14/504,038, dated Mar. 22, 2017, 33 pages.
"Non-Final Office Action", U.S. Appl. No. 15/287,394, dated Mar. 22, 2019, 39 pages.
"Non-Final Office Action", U.S. Appl. No. 15/166,198, dated Feb. 21, 2019, 48 pages.
"Non-Final Office Action", U.S. Appl. No. 15/398,147, dated Sep. 8, 2017, 7 pages.
"Non-Final Office Action", U.S. Appl. No. 14/874,955, dated Feb. 8, 2018, 7 pages.
"Non-Final Office Action", U.S. Appl. No. 14/681,625, dated Mar. 6, 2017, 7 pages.
"Non-Final Office Action", U.S. Appl. No. 15/586,174, dated Jun. 18, 2018, 7 pages.
"Non-Final Office Action", U.S. Appl. No. 14/504,061, dated Nov. 4, 2015, 8 pages.
"Non-Final Office Action", U.S. Appl. No. 14/874,955, dated Feb. 27, 2017, 8 pages.
"Non-Final Office Action", U.S. Appl. No. 16/744,626, dated Sep. 23, 2020, 9 Pages.
"Non-Final Office Action", U.S. Appl. No. 14/582,896, dated Jun. 29, 2016, 9 pages.
"Non-Final Office Action", U.S. Appl. No. 14/681,625, dated Aug. 12, 2016, 9 pages.
"Non-Final Office Action", U.S. Appl. No. 14/666,155, dated Aug. 24, 2016, 9 pages.
"Non-Final Office Action", U.S. Appl. No. 14/513,875, dated Feb. 21, 2017, 9 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, May 29, 2009, 2 pages.
"Notice of Allowability", U.S. Appl. No. 16/560,085, dated Nov. 12, 2020, 2 pages.
"Notice of Allowance", U.S. Appl. No. 16/744,626, dated Jan. 1, 2021, 10 pages.
"Notice of Allowance", U.S. Appl. No. 16/238,464, dated Nov. 4, 2019, 10 Pages.
"Notice of Allowance", U.S. Appl. No. 15/424,263, dated Nov. 14, 2019, 10 Pages.
"Notice of Allowance", U.S. Appl. No. 15/287,394, dated Mar. 4, 2020, 11 Pages.
"Notice of Allowance", U.S. Appl. No. 14/599,954, dated May 24, 2017, 11 pages.
"Notice of Allowance", U.S. Appl. No. 16/153,395, dated Feb. 20, 2020, 13 Pages.
"Notice of Allowance", U.S. Appl. No. 15/917,238, dated Aug. 21, 2019, 13 pages.
"Notice of Allowance", U.S. Appl. No. 15/287,253, dated Aug. 26, 2019, 13 Pages.
"Notice of Allowance", U.S. Appl. No. 15/286,512, dated Apr. 9, 2019, 14 pages.
"Notice of Allowance", U.S. Appl. No. 14/312,486, dated Oct. 7, 2016, 15 pages.
"Notice of Allowance", U.S. Appl. No. 16/401,611, dated Jun. 10, 2020, 17 Pages.
"Notice of Allowance", U.S. Appl. No. 15/287,308, dated Jul. 17, 2019, 17 Pages.
"Notice of Allowance", U.S. Appl. No. 14/504,038, dated Aug. 7, 2017, 17 pages.
"Notice of Allowance", U.S. Appl. No. 15/403,066, dated Jan. 8, 2018, 18 pages.
"Notice of Allowance", U.S. Appl. No. 15/287,200, dated Nov. 6, 2018, 19 pages.
"Notice of Allowance", U.S. Appl. No. 15/286,152, dated Mar. 5, 2019, 23 pages.
"Notice of Allowance", U.S. Appl. No. 16/356,748, dated Feb. 11, 2020, 5 Pages.
"Notice of Allowance", U.S. Appl. No. 14/715,793, dated Jul. 6, 2018, 5 pages.
"Notice of Allowance", U.S. Appl. No. 15/093,533, dated Jul. 16, 2020, 5 Pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/582,896, dated Nov. 7, 2016, 5 pages.
"Notice of Allowance", U.S. Appl. No. 15/703,511, dated Apr. 16, 2019, 5 pages.
"Notice of Allowance", U.S. Appl. No. 15/586,174, dated Sep. 24, 2018, 5 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.
"Notice of Allowance", U.S. Appl. No. 15/142,471, dated Aug. 6, 2020, 7 Pages.
"Notice of Allowance", U.S. Appl. No. 16/389,402, dated Aug. 21, 2019, 7 Pages.
"Notice of Allowance", U.S. Appl. No. 16/380,245, dated Sep. 15, 2020, 7 Pages.
"Notice of Allowance", U.S. Appl. No. 14/874,955, dated Oct. 20, 2017, 7 pages.
"Notice of Allowance", U.S. Appl. No. 14/504,061, dated Sep. 12, 2016, 7 pages.

(56) References Cited

OTHER PUBLICATIONS

"Notice of Allowance", U.S. Appl. No. 14/494,863, dated May 30, 2017, 7 pages.
"Notice of Allowance", U.S. Appl. No. 14/681,625, dated Jun. 7, 2017, 7 pages.
"Notice of Allowance", U.S. Appl. No. 15/286,837, dated Mar. 6, 2019, 7 pages.
"Notice of Allowance", U.S. Appl. No. 14/731,195, dated Apr. 24, 2019, 7 pages.
"Notice of Allowance", U.S. Appl. No. 14/862,409, dated Jun. 6, 2018, 7 pages.
"Notice of Allowance", U.S. Appl. No. 15/287,155, dated Jul. 25, 2019, 7 pages.
"Notice of Allowance", U.S. Appl. No. 15/462,957, dated Jan. 23, 2020, 8 Pages.
"Notice of Allowance", U.S. Appl. No. 15/791,044, dated Feb. 12, 2020, 8 Pages.
"Notice of Allowance", U.S. Appl. No. 16/252,477, dated Jun. 24, 2020, 8 Pages.
"Notice of Allowance", U.S. Appl. No. 15/362,359, dated Aug. 3, 2018, 8 pages.
"Notice of Allowance", U.S. Appl. No. 16/560,085, dated Oct. 19, 2020, 8 pages.
"Notice of Allowance", U.S. Appl. No. 14/681,625, dated Oct. 23, 2017, 8 pages.
"Notice of Allowance", U.S. Appl. No. 14/874,955, dated Oct. 4, 2018, 8 pages.
"Notice of Allowance", U.S. Appl. No. 15/398,147, dated Nov. 15, 2017, 8 pages.
"Notice of Allowance", U.S. Appl. No. 16/669,842, dated Dec. 18, 2020, 8 pages.
"Notice of Allowance", U.S. Appl. No. 14/959,730, dated Feb. 22, 2018, 8 pages.
"Notice of Allowance", U.S. Appl. No. 15/142,829, dated Feb. 6, 2019, 8 pages.
"Notice of Allowance", U.S. Appl. No. 14/930,220, dated Feb. 2, 2017, 8 pages.
"Notice of Allowance", U.S. Appl. No. 15/352,194, dated Jun. 26, 2019, 8 pages.
"Notice of Allowance", U.S. Appl. No. 15/595,649, dated Sep. 14, 2018, 8 pages.
"Notice of Allowance", U.S. Appl. No. 15/343,067, dated Jul. 27, 2017, 9 pages.
"Notice of Allowance", U.S. Appl. No. 16/356,748, dated Oct. 17, 2019, 9 Pages.
"Notice of Allowance", U.S. Appl. No. 15/142,689, dated Oct. 30, 2018, 9 pages.
"Notice of Allowance", U.S. Appl. No. 14/504,137, dated Feb. 6, 2019, 9 pages.
"Notice of Allowance", U.S. Appl. No. 14/599,954, dated Mar. 15, 2018, 9 pages.
"Notice of Allowance", U.S. Appl. No. 15/142,619, dated Aug. 13, 2018, 9 pages.
"Philips Vital Signs Camera", Retrieved From: <http://www.vitalsignscamera.com/> Apr. 15, 2015, dated Jul. 17, 2013, 2 pages.
"Pre-Interview Communication", U.S. Appl. No. 15/287,359, dated Jul. 24, 2018, 2 pages.
"Pre-Interview Communication", U.S. Appl. No. 16/380,245, dated Jun. 15, 2020, 3 Pages.
"Pre-Interview Communication", U.S. Appl. No. 16/080,293, dated Jun. 25, 2020, 3 Pages.
"Pre-Interview Communication", U.S. Appl. No. 15/142,471, dated Dec. 12, 2018, 3 pages.
"Pre-Interview Communication", U.S. Appl. No. 14/513,875, dated Oct. 21, 2016, 3 pages.
"Pre-Interview Communication", U.S. Appl. No. 14/959,901, dated Feb. 10, 2017, 3 pages.
"Pre-Interview Communication", U.S. Appl. No. 14/959,730, dated Feb. 15, 2017, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/343,067, dated Apr. 19, 2017, 3 pages.
"Pre-Interview Communication", U.S. Appl. No. 16/401,611, dated Apr. 13, 2020, 4 Pages.
"Pre-Interview Communication", U.S. Appl. No. 15/286,495, dated Sep. 10, 2018, 4 pages.
"Pre-Interview Communication", U.S. Appl. No. 15/362,359, dated May 17, 2018, 4 pages.
"Pre-Interview Communication", U.S. Appl. No. 15/703,511, dated Feb. 11, 2019, 5 pages.
"Pre-Interview Communication", U.S. Appl. No. 14/494,863, dated Jan. 27, 2017, 5 pages.
"Pre-Interview Communication", U.S. Appl. No. 15/917,238, dated May 1, 2019, 6 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Pre-Interview Office Action", U.S. Appl. No. 14/862,409, dated Sep. 15, 2017, 16 pages.
"Pre-Interview Office Action", U.S. Appl. No. 14/731,195, dated Dec. 20, 2017, 4 pages.
"Preliminary Report on Patentability", PCT Application No. PCT/US2016/034366, dated Dec. 7, 2017, 10 pages.
"Preliminary Report on Patentability", PCT Application No. PCT/US2016/030177, dated Oct. 31, 2017, 11 pages.
"Preliminary Report on Patentability", PCT Application No. PCT/US2016/030115, dated Oct. 31, 2017, 15 pages.
"Preliminary Report on Patentability", PCT Application No. PCT/US2016/030185, dated Nov. 9, 2017, 16 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/062082, dated Nov. 15, 2018, 8 pages.
"Preliminary Report on Patentability", PCT Application No. PCT/US2016/055671, dated Apr. 10, 2018, 9 pages.
"Preliminary Report on Patentability", PCT Application No. PCT/US2016/032307, dated Dec. 7, 2017, 9 pages.
"Pressure-vol. Loop Analysis in Cardiology", retrieved from https://en.wikipedia.org/w/index.php?t itle=Pressure-volume loop analysis in card iology&oldid=636928657 on Sep. 23, 2017; Obtained per link provided in search report from PCT/US2016/01398 on Jul. 28, 2016, Dec. 6, 14, 10 pages.
"Restriction Requirement", U.S. Appl. No. 15/976,518, dated Jul. 9, 2020, 5 Pages.
"Restriction Requirement", U.S. Appl. No. 15/362,359, dated Jan. 8, 2018, 5 pages.
"Restriction Requirement", U.S. Appl. No. 14/666,155, dated Jul. 22, 2016, 5 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"Restriction Requirement", U.S. Appl. No. 15/286,537, dated Aug. 27, 2018, 8 pages.
"Samsung Galaxy S4 Air Gestures", Video retrieved from https://www.youtube.com/watch7v=375Hb87yGcg, May 7, 2013, 4 pages.
"Search Report", GB Application No. 2007255.9, dated Jul. 6, 2020, 1 page.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.

(56) References Cited

OTHER PUBLICATIONS

"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 18, 4 pages.
"Written Opinion", PCT Application No. PCT/US2016/030185, dated Nov. 3, 2016, 15 pages.
"Written Opinion", PCT Application No. PCT/US2017/032733, dated Jul. 24, 2017, 5 pages.
"Written Opinion", PCT Application No. PCT/US2017/032733, dated Jul. 26, 2017, 5 pages.
"Written Opinion", PCT Application No. PCT/US2016/042013, dated Feb. 2, 2017, 6 pages.
"Written Opinion", PCT Application No. PCT/US2016/060399, dated May 11, 2017, 6 pages.
"Written Opinion", PCT Application No. PCT/US2016/026756, dated Nov. 10, 2016, 7 pages.
"Written Opinion", PCT Application No. PCT/US2016/055671, dated Apr. 13, 2017, 8 pages.
"Written Opinion", PCT Application No. PCT/US2017/051663, dated Oct. 12, 2018, 8 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.
"Written Opinion", PCT Application No. PCT/US2016/030177, dated Nov. 3, 2016, 9 pages.
Amihood, Patrick M. et al., "Closed-Loop Manufacturing System Using Radar", Technical Disclosure Commons; Retrieved from http://www.tdcommons.org/dpubs_series/464, Apr. 17, 2017, 8 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Arbabian, Amin et al., "A 94GHz mm-Wave to Baseband Pulsed-Radar for Imaging and Gesture Recognition", 2012 IEEE, 2012 Symposium on VLSI Circuits Digest of Technical Papers, Jan. 1, 2012, 2 pages.
Azevedo, Stephen et al., "Micropower Impulse Radar", Science & Technology Review, Feb. 29, 1996, pp. 16-29, Feb. 29, 1996, 7 pages.
Badawy, Wael "System on Chip", Section 1.1 "Real-Time Applications" Springer Science & Business Media,, 2003, 14 pages.
Balakrishnan, Guha et al., "Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Bondade, Rajdeep et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Cheng, Jingyuan "Smart Textiles: From Niche to Mainstream", IEEE Pervasive Computing, pp. 81-84.
Couderc, Jean-Philippe et al., "Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, 7 pages.
Dias, T et al., "Capacitive Fibre-Meshed Transducer for Touch & Proximity Sensing Applications", IEEE Sensors Journal, IEEE Service Center, New York, NY, US, vol. 5, No. 5, Oct. 1, 2005 (Oct. 1, 2005), pp. 989-994, XP011138559, ISSN: 1530-437X, DOI: 10.1109/JSEN.2005.844327, Oct. 1, 2005, 5 pages.
Duncan, David P. "Motion Compensation of Synthetic Aperture Radar", Microwave Earth Remote Sensing Laboratory, Brigham Young University, Apr. 15, 2003, 5 pages.
Espina, Javier et al., "Wireless Body Sensor Network for Continuous Cuff-less Blood Pressure Monitoring", International Summer School on Medical Devices and Biosensors, 2006, 5 pages.
Fan, Tenglong et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN 0018-9480, DOI: 10.1109/TMTT.2016.2610427, Nov. 1, 2016, 9 pages.
Farringdon, Jonny et al., "Wearable Sensor Badge & Sensor Jacket for Context Awareness", Third International Symposium on Wearable Computers, 7 pages.
Garmatyuk, Dmitriy S et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Geisheimer, Jonathan L. et al., "A Continuous-Wave (CW) Radar for Gait Analysis", IEEE 2001, 2001, 5 pages.
Godana, Bruhtesfa E. "Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
GüRBüZ, Sevgi Z. et al., "Detection and Identification of Human Targets in Radar Data", Proc. SPIE 6567, Signal Processing, Sensor Fusion, and Target Recognition XVI, 656701, May 7, 2007, 12 pages.
He, David D. "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, 137 pages.
Holleis, Paul et al., "Evaluating Capacitive Touch Input on Clothes", Proceedings of the 10th International Conference on Human Computer Interaction, Jan. 1, 2008, 10 pages.
Holleis, Paul et al., "Evaluating Capacitive Touch Input on Clothes", Proceedings of the 10th International Conference on Human Computer Interaction With Mobile Devices and Services, Jan. 1, 2008 (Jan. 1, 2008), p. 81, XP055223937, New York, NY, US DOI: 10.1145/1409240.1409250 ISBN: 978-1-59593-952-4, Jan. 1, 2008, 11 pages.
Hollington, Jessie "Playing back all songs on iPod", retrieved at: https://www.ilounge.com/index.php/articles/comments/playing-back-all-songs-on-ipod, Aug. 22, 2008, 2 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 on Jul. 28, 2016, Sep. 26, 2007, 3 pages.
Karagozler, Mustafa E. et al., "Embedding Radars in Robots to Accurately Measure Motion", Technical Disclosure Commons; Retrieved from http://www.tdcommons.org/dpubs_series/454, Mar. 30, 2017, 8 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 12 pages.
Lee, Cullen E. "Computing the Apparent Centroid of Radar Targets", Sandia National Laboratories; Presented at the Proceedings of the 1996 IEEE National Radar Conference: Held at the University of Michigan; May 13-16, 1996; retrieved from https://www.osti.gov/scitech/servlets/purl/218705 on Sep. 24, 2017, 21 pages.
Lien, Jaime et al., "Embedding Radars in Robots for Safety and Obstacle Detection", Technical Disclosure Commons; Retrieved from http://www.tdcommons.org/dpubs_series/455, Apr. 2, 2017, 10 pages.
Lien, Jaime et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.

(56) References Cited

OTHER PUBLICATIONS

Martinez-Garcia, Hermino et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016)pp. 151-160, XP035898949, ISSN 0925-1030, DOI: 10.1007/S10470-016-0747-8, Apr. 23, 2016, 10 pages.

Matthews, Robert J. "Venous Pulse", Retrieved at: http://www.rjmatthewsmd.com/Definitions/venous_pulse.htm—on Nov. 30, 2016, Apr. 13, 2013, 7 pages.

Nakajima, Kazuki et al., "Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, 8 pages.

Narasimhan, Shar "Combining Self- & Mutual-Capacitive Sensing for Distinct User Advantages", Retrieved from the Internet URL:http://www.designnews.com/author.asp?section_id=1365&doc_id=271356&print=yes [retrieved on Oct. 1, 2015], Jan. 31, 2014, 5 pages.

Oiio, Chris et al., "System Architecture of a Wireless Body Area Sensor Network for Ubiquitous Health Monitoring", Journal of Mobile Multimedia; vol. 1, No. 4, Jan. 10, 2006, 20 pages.

Palese, et al., "The Effects of Earphones and Music on the Temperature Measured by Infrared Tympanic Thermometer: Preliminary Results", ORL -head and neck nursing: official journal of the Society of Otorhinolaryngology and Head-Neck Nurses 32.2, Jan. 1, 2013, pp. 8-12.

Patel, P C. et al., "Applications of Electrically Conductive Yarns in Technical Textiles", International Conference on Power System Technology (POWECON), Oct. 30, 2012, 6 pages.

Poh, Ming-Zher et al., "A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, Jan. 1, 2011, 1 page.

Poh, Ming-Zher et al., "Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D1_8%2D10%2D10762%2Ep, May 7, 2010, 13 pages.

Pu, Qifan et al., "Gesture Recognition Using Wireless Signals", pp. 15-18.

Pu, Qifan et al., "Whole-Home Gesture Recognition Using Wireless Signals", MobiCom'13, Sep. 30-Oct. 4, Miami, FL, USA, Sep. 2013, 12 pages.

Pu, Qifan et al., "Whole-Home Gesture Recognition Using Wireless Signals", MobiCom'13, Sep. 30-Oct. 4, Miami, FL, USA, 2013, 12 pages.

Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.

Pu, Quifan et al., "Whole-Home Gesture Recognition Using Wireless Signals", MobiCom '13 Proceedings of the 19th annual international conference on Mobile computing & networking, Aug. 27, 2013, 12 pages.

Schneegass, Stefan et al., "Towards a Garment OS: Supporting Application Development for Smart Garments", Wearable Computers, ACM, Sep. 13, 2014, 6 pages.

Skolnik, Merrill I. "CW and Frequency-Modulated Radar", In: "Introduction To Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.

Stoppa, Matteo "Wearable Electronics and Smart Textiles: A Critical Review", In Proceedings of Sensors, vol. 14, Issue 7, Jul. 7, 2014, pp. 11957-11992.

Wang, Wenjin et al., "Exploiting Spatial Redundancy of Image Sensor for Motion Robust rPPG", In Proceedings: IEEE Transactions on Biomedical Engineering, vol. 62, Issue 2, Jan. 19, 2015, 11 pages.

Wang, Yazhou et al., "Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.

Wijesiriwardana, R et al., "Capacitive Fibre-Meshed Transducer for Touch & Proximity Sensing Applications", IEEE Sensors Journal, IEEE Service Center, Oct. 1, 2005, 5 pages.

Zhadobov, Maxim et al., "Millimeter-Wave Interactions with the Human Body: State of Knowledge and Recent Advances", International Journal of Microwave and Wireless Technologies, p. 1 of 11. # Cambridge University Press and the European Microwave Association, 2011 doi:10.1017/S1759078711000122, 2011.

Zhadobov, Maxim et al., "Millimeter-wave Interactions with the Human Body: State of Knowledge and Recent Advances", International Journal of Microwave and Wireless Technologies, Mar. 1, 2011, 11 pages.

Zhang, Ruquan et al., "Study of the Structural Design and Capacitance Characteristics of Fabric Sensor", Advanced Materials Research (vols. 194-196), Feb. 21, 2011, 8 pages.

Zheng, Chuan et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.

"Advisory Action", U.S. Appl. No. 16/689,519, dated Jun. 30, 2021, 2 pages.

"Corrected Notice of Allowance", U.S. Appl. No. 16/563,124, dated Jul. 23, 2021, 2 pages.

"Final Office Action", U.S. Appl. No. 16/689,519, dated Apr. 29, 2021, 13 pages.

"Foreign Office Action", GB Application No. 1621191.4, dated Jun. 23, 2021, 4 pages.

"Notice of Allowance", U.S. Appl. No. 14/504,121, dated Jun. 1, 2021, 8 pages.

"Notice of Allowance", U.S. Appl. No. 16/503,234, dated Jun. 11, 2021, 8 pages.

"Notice of Allowance", U.S. Appl. No. 16/843,813, dated Jun. 30, 2021, 8 pages.

"Notice of Allowance", U.S. Appl. No. 16/563,124, dated Jul. 8, 2021, 9 pages.

"Notice of Allowance", U.S. Appl. No. 17/005,207, dated Jul. 14, 2021, 5 pages.

"Patent Board Decision", U.S. Appl. No. 14/504,121, dated May 20, 2021, 9 pages.

"Advisory Action", U.S. Appl. No. 15/704,825, dated Feb. 10, 2021, 4 pages.

"Corrected Notice of Allowance", U.S. Appl. No. 16/560,085, dated Jan. 28, 2021, 2 pages.

"Corrected Notice of Allowance", U.S. Appl. No. 16/744,626, dated Feb. 3, 2021, 2 pages.

"Corrected Notice of Allowance", U.S. Appl. No. 16/669,842, dated Feb. 18, 2021, 2 pages.

"Foreign Office Action", KR Application No. 10-2019-7004803, dated Jan. 21, 2021, 6 pages.

"Non-Final Office Action", U.S. Appl. No. 16/822,601, dated Mar. 15, 2021, 17 pages.

"Non-Final Office Action", U.S. Appl. No. 16/843,813, dated Mar. 18, 2021, 12 pages.

"Non-Final Office Action", U.S. Appl. No. 16/503,234, dated Mar. 18, 2021, 17 pages.

"Non-Final Office Action", U.S. Appl. No. 17/005,207, dated Apr. 1, 2021, 23 pages.

"Notice of Allowance", U.S. Appl. No. 15/287,359, dated Apr. 14, 2021, 7 pages.

"Restriction Requirement", U.S. Appl. No. 16/563,124, dated Apr. 5, 2021, 7 pages.

"Foreign Office Action", GB Application No. 1621191.4, dated Sep. 10, 2021, 3 pages.

(56) References Cited

OTHER PUBLICATIONS

"Non-Final Office Action", U.S. Appl. No. 16/875,427, dated Oct. 5, 2021, 37 pages.
"Notice of Allowance", U.S. Appl. No. 16/822,601, dated Aug. 5, 2021, 9 pages.
"Notice of Allowance", U.S. Appl. No. 15/976,518, dated Sep. 28, 2021, 7 pages.
"Notice of Allowance", U.S. Appl. No. 16/689,519, dated Sep. 30, 2021, 9 pages.

* cited by examiner

OCCLUDED GESTURE RECOGNITION

PRIORITY APPLICATIONS

This application is a continuation of and claims priority to U.S. patent application Ser. No. 16/560,085 filed Sep. 4, 2019 entitled "Occluded Gesture Recognition", which in turn claims priority to U.S. patent application Ser. No. 15/703,511 filed Sep. 13, 2017, now U.S. Pat. No. 10,409,383 entitled "Occluded Gesture Recognition", which in turn claims priority to U.S. patent application Ser. No. 14/494,863 filed Sep. 24, 2014, now U.S. Pat. No. 9,778,749 entitled "Occluded Gesture Recognition", which in turn claims priority under 35 U.S.C. § 119(e) to U.S. Provisional Patent Application No. 62/040,896 filed Aug. 22, 2014 entitled "Occluded Gesture Recognition", the disclosure of which is incorporated in its entirety by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Mobile computing devices continue to increase in popularity, as these devices are small, light, and often have substantial computing and communication capabilities. To enjoy these many capabilities, users desire seamless and near-constant control of their devices. Conventional techniques, however, do not permit seamless and near-constant control.

To address this desire, some other conventional techniques provide audio interfaces. These audio interfaces can help users control their devices when their hands are occupied and audio interference is minimal, such as when driving. These conventional techniques, however, often fail to understand a user's commands. Even when these conventional techniques do understand a user's commands, they fail to enable control in a large set of circumstances during which control is desired.

SUMMARY

This document describes techniques and devices for occluded gesture recognition. Through use of the techniques and devices described herein, users may control their devices even when a user's gesture is occluded by some material between the user's hands and the device itself. Thus, the techniques enable users to control their mobile devices in many situations in which control is desired but conventional techniques do permit effective control, such as when a user's mobile computing device is occluded by being in a purse, bag, pocket, or even in another room.

This summary is provided to introduce simplified concepts relating to occluded gesture recognition, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for occluded gesture recognition are described with reference to the following drawings. The same numbers are used throughout the drawings to reference like features and components.

DETAILED DESCRIPTION

Overview

This document describes techniques and devices enabling occluded gesture recognition. These techniques and devices enable greater control of mobile devices through recognizing gestures when those gestures are occluded from the mobile device.

Consider, for example, a case where a user's smartphone is in her purse. The techniques enable her to control her smartphone without having to fumble through her purse to find her smartphone. Assume that she is in a meeting and her phone begins to ring loudly—rather than have it continue to ring until she finds the smartphone, gets it out of her purse, looks at her touch interface to find a control to mute the volume, and then selects the mute control—she instead makes a simple gesture "in the air" near her purse and her smartphone is immediately silent.

By way of another example, assume that a user is walking to work on a cold, rainy morning. Because of this, his media player is in his briefcase, protected from the rain, while he listens with earphones through a personal area network in communication with the media player. Rather than have to hold and interact with the media player, the techniques enable him to pause, adjust a volume, or advance to another song simply with a gesture made "in the air"—he need not touch his media player or even the earphones in his ears. The techniques even enable the user to make a gesture while his hands are in his jacket pockets, protected from the cold.

These are but two examples in which occluded gesture recognition can be performed. This document now turns to an example environment, after which example occluded-gesture recognition systems, example methods, and an example computing system are described.

Example Environment

Figure 1:
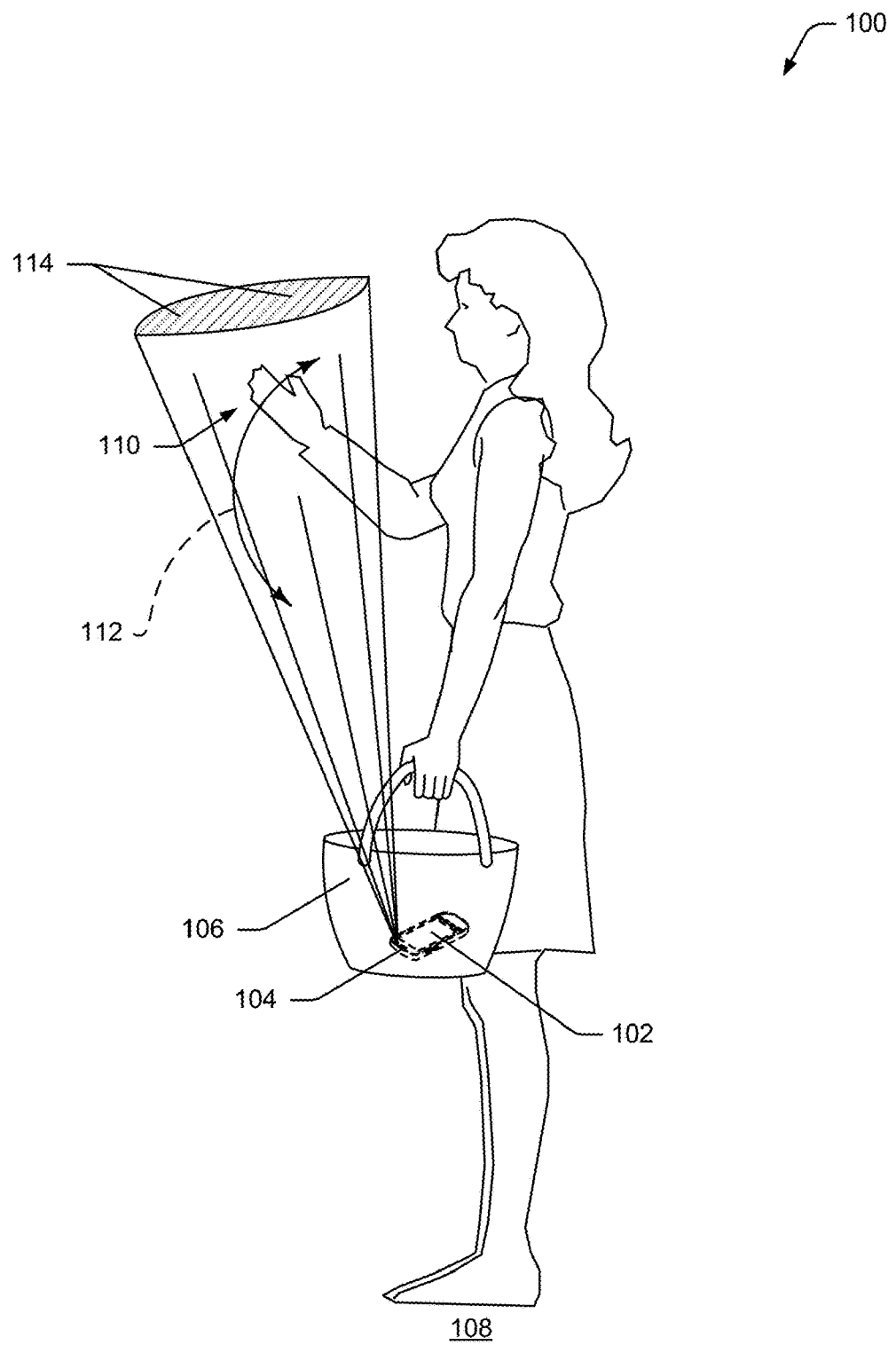
FIG. 1 illustrates an example environment in which occluded gesture recognition can be implemented.

FIG. 1 is an illustration of an example environment 100 in which techniques enabling occluded gesture recognition can be performed. Environment 100 includes a mobile computing device 102 having an occluded-gesture recognition system 104, a closed purse 106, a person 108, a hand 110 of person 108 performing an up-and-down gesture 112, and a radar field 114 generated by occluded-gesture recognition system 104. As shown, mobile computing device 102 is within closed purse 106 and thus hand 110 is occluded from mobile computing device 102 due to the material of closed purse 106. Radar field 114, described in detail below, is configured to penetrate various materials, such as wool, cotton, nylon, or leather, but reflect from human tissue of hand 110, thereby enabling recognition of occluded gestures.

Figure 2:
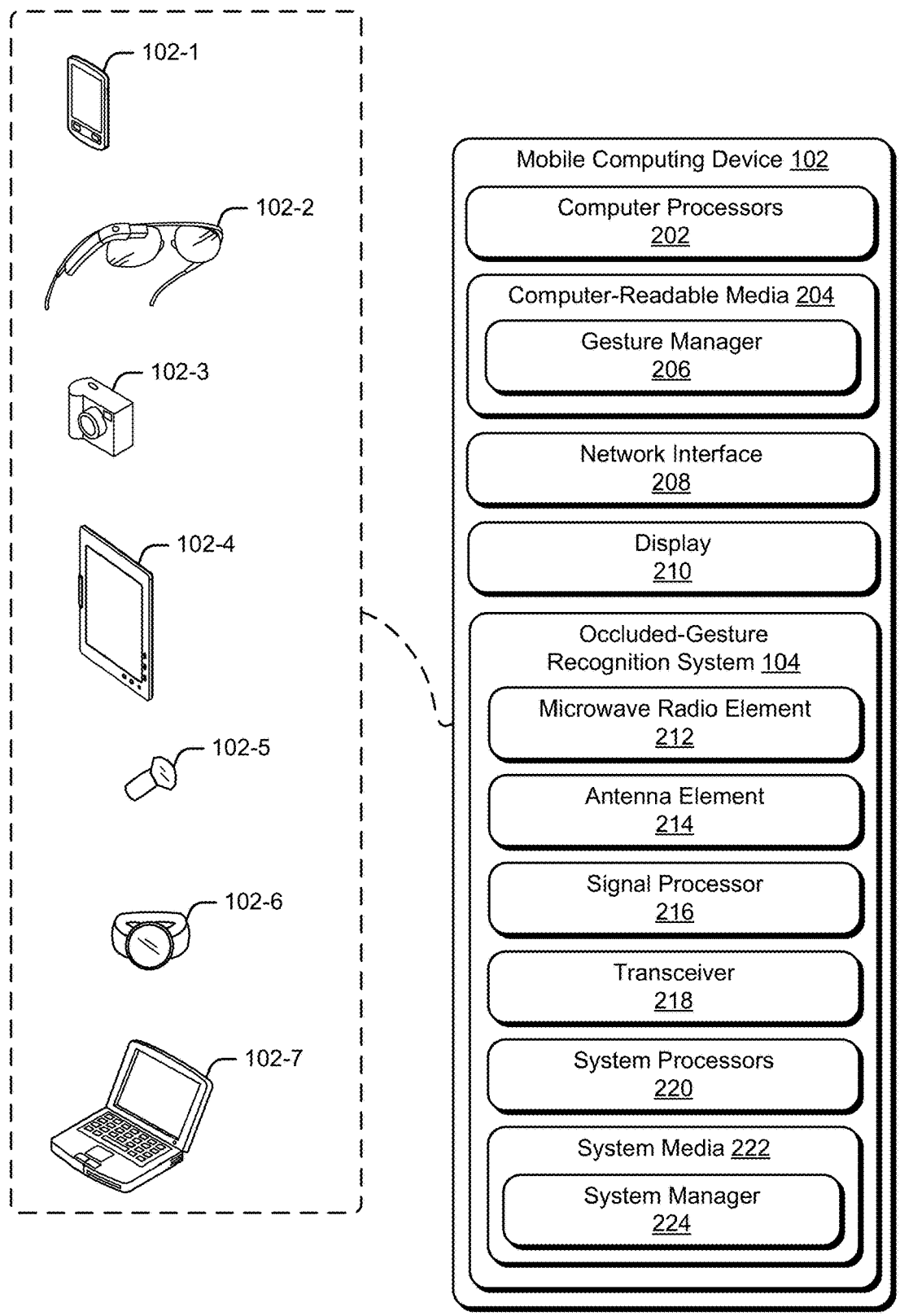
FIG. 2 illustrates the mobile computing device of FIG. 1 in greater detail.

In more detail, consider FIG. 2, which illustrates mobile computing device 102 including one or more computer processors 202 and computer-readable media 204, which includes memory media and storage media. Applications and/or an operating system (not shown) embodied as computer-readable instructions on computer-readable media 204 can be executed by processors 202 to provide some of the functionalities described herein. Computer-readable media 204 also includes gesture manager 206 (described below).

Computing device 102 may also include network interfaces 208 for communicating data over wired, wireless, or optical networks. By way of example and not limitation, network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. Mobile computing device 102 may also include a display 210, though this is not required.

Occluded-gesture recognition system 104, as noted above, is configured to sense gestures. To enable this, occluded-gesture recognition system 104 includes a microwave radio element 212, an antenna element 214, and a signal processor 216. Generally, microwave radio element 212 is configured to provide a radar field that is capable of penetrating some materials, such as textiles, and reflecting from other materials, such as human tissue. While examples shown herein generally show one occluded-gesture recognition system 104 per device, multiples can be used, thereby increasing a number and complexity of gestures, as well as accuracy, resolution, and robust recognition.

This radar field can be large or small and be widely dispersed or narrowly directed (e.g., focused). In some cases described below, the radar field is directed to a particular user's hands, which can improve accuracy, reduce power costs, and/or direct reception of gestures to those of an identified hand.

Microwave radio element 212 can be configured to emit continuously modulated radiation, ultra-wideband radiation, or sub-millimeter-frequency radiation. Microwave radio element 212, in some cases, is configured to form radiation in beams, the beams aiding antenna element 214 and signal processor 216 to determine which of the beams are interrupted, and thus locations of interactions (e.g., by a hand) within the radar field. In more detail, microwave radio element 212 can be configured to emit microwave radiation in a 1 GHz to 300 GHz range, as well as 57 GHz to 63 GHz, to provide the radar field. This range affects antenna element 214's ability to sense interactions, such as to track locations of two or more targets to a resolution of about two to about 25 millimeters. Microwave radio element 212 can be configured, along with other entities of occluded-gesture recognition system 104, to have a relatively fast update rate, which can aid in resolution of the interactions. By selecting particular frequencies, occluded-gesture recognition system 104 can operate to substantially penetrate clothing while not substantially penetrating human tissue.

Antenna element 214 is configured to receive reflections of, or sense interactions in, the radar field, and signal processor 216 is configured to process the reflections or sensed interactions in the radar field sufficient to provide gesture data usable to determine a gesture from the sensed interactions. Antenna element 214 can include one or many sensors, such as an array of radiation sensors, the number in the array based on a desired resolution and whether the field is a surface, plane, or volume. Alternately or additionally, antenna element 214 may include one or many antennas, such as an array of antennas, directional or otherwise, coupled with respective radiation sensors and/or signal processor 216.

Further, antenna element 214 or signal processor 216 can be configured to differentiate between interactions in the radar field caused by clothing from those interactions in the radar field caused by human tissue. Thus, a user with a smartphone 102-1 (that includes occluded-gesture recognition system 104) that is placed within a jacket or shirt pocket covering microwave radio element 212, and even with hands wearing gloves or in another pocket may still control the mobile computing device 102 through use of occluded-gesture recognition system 104.

The field provided by microwave radio element 212 can be a three-dimensional (3D) volume (e.g., hemisphere, cube, cylinder, cone), a plane, or a surface applied to human tissue or non-human object. In the case of a 3D volume, antenna element 214 is configured to sense interactions in the 3D volume of multiple targets (e.g., two hands, fingers of one or two hands, etc.), and signal processor 216 is configured to process the sensed interactions in the 3D volume sufficient to provide gesture data usable to determine gestures in three dimensions.

Figure 3:
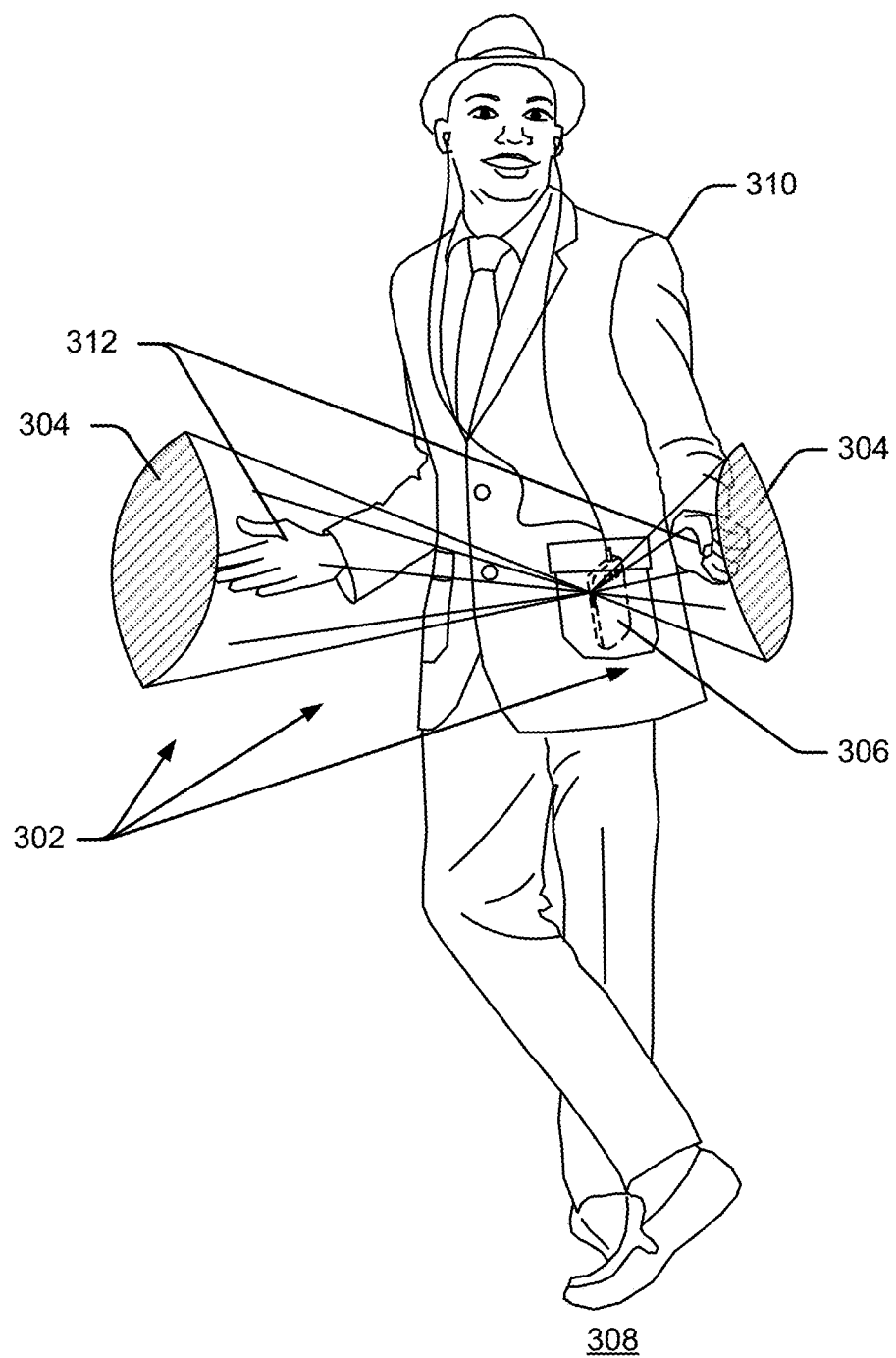
FIG. 3 illustrates an example 3D volume radar field emitted by the occluded-gesture recognition system of FIG. 2 as a volumetric cone.

An example of a 3D volume is illustrated in FIG. 3, which shows a 3D volume radar field 302, formed as two volumetric cones 304 and emitted by occluded-gesture recognition system 104 of media player 306. Note that media player 306 is placed within, and occluded by, fabric of man 308's jacket 310. As described later below, 3D volume radar field 302 can be directed toward particular locations, such as through tracking of man 308's hands 312.

With 3D volume radar field 302, a user may perform complex or simple gestures with a hand or device (e.g., a stylus) that interrupts the volume. Example gestures include the many gestures usable with current touch-sensitive displays, such as swipes, two-finger pinch and spread, tap, and so forth. Other gestures are enabled that are complex, or simple but three-dimensional, examples include the many sign-language gestures, e.g., those of American Sign Language (ASL) and other sign languages worldwide. A few of these include an up-and-down fist, which in ASL means "Yes", an open index and middle finger moving to connect to an open thumb, which means "No", a flat hand moving up a step, which means "Advance", a flat and angled hand moving up and down, which means "Afternoon", clenched fingers and open thumb moving to open fingers and an open thumb, which means "taxicab", an index finger moving up in a roughly vertical direction, which means "up", and so forth. These are but a few of many gestures that can be mapped to particular devices or applications, such as the "Advance" gesture to skip to another song being played by media player 306 through an occluded gesture performed by man 308's hand 312.

Figure 4:
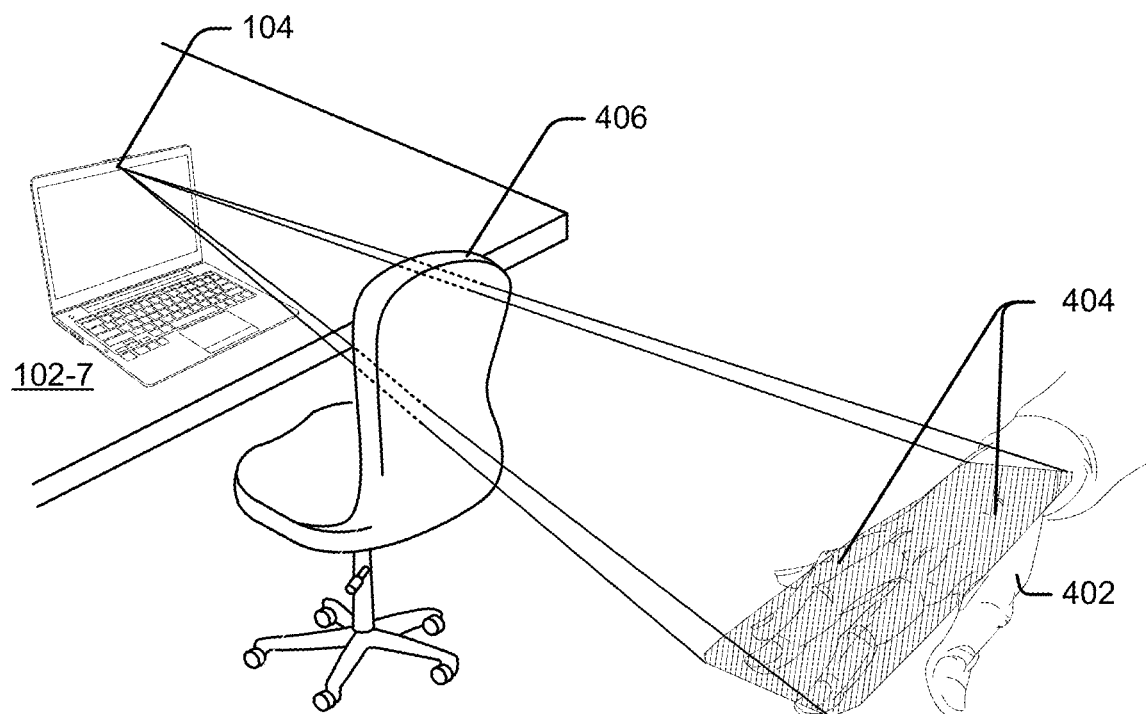
FIG. 4 illustrates an example surface radar field emitted by the occluded-gesture recognition system of FIG. 2.

The radar field can also include a surface applied to human tissue. This is illustrated at FIG. 4, which shows hand 402 having a surface radar field 404 provided by occluded-gesture recognition system 104 of laptop 102-7. Radio emitter 212 (not shown) provides surface radar field 404 penetrating chair 406 and applied to hand 402. In this case, antenna element 214 (not shown) is configured to receive a reflection caused by an interaction on the surface of hand 402 that penetrates (e.g., reflects back through) chair 406 and signal processor 216 is configured to process the received reflection on the surface sufficient to provide gesture data usable to determine a gesture. Note that with surface radar field 404, another hand may interact to perform gestures, such as to tap on the surface on hand 402, thereby interacting with surface radar field 404. Example gestures include single and multi-finger swipe, spread, squeeze, non-linear movements, and so forth. Or hand 402 may simply move or change shape to cause reflections, thereby also performing an occluded gesture.

Gestures can be mapped to various control inputs, thereby enabling control of many devices and applications. Many complex and unique gestures can be recognized by occluded-gesture recognition systems 104, thereby permitting precise and/or single-gesture control, even for multiple applications. Occluded-gesture recognition systems 104, while shown integral with mobile computing device 102, can be instead be part of a device having few or no computing capabilities, instead providing gesture data to be recognized and/or mapped to a control input. Occluded-gesture recognition system 104 can communicate with other devices through network interface 208 through a network, such as one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Mobile computing device 102 is illustrated with various non-limiting example devices: smartphone 102-1, computing spectacles 102-2, camera 102-3, tablet 102-4, computing bracelet 102-5, computing ring 102-6, and laptop 102-7, though other devices may also be used, such as wearable devices such as a brooch or necklace, netbooks, and e-readers.

Occluded-gesture recognition system 104 also includes a transceiver 218 configured to transmit gesture data to a remote device, such as in cases where occluded-gesture recognition system 104 is not integrated with mobile computing device 102. Gesture data can be provided in a format usable by the receiving device sufficient to recognize a gesture using the gesture data.

Occluded-gesture recognition system 104 may also include one or more system processors 220 and system media 222 (e.g., one or more computer-readable storage media). System media 222 includes system manager 224, which can perform various operations, including determining a gesture based on gesture data from signal processor 216, mapping the determined gesture to a pre-configured control gesture associated with a control input for an application associated with remote device, and causing transceiver 218 to transmit the control input to the remote device effective to enable control of the application or device. This is but one of the ways in which the above-mentioned control through occluded-gesture recognition system 104 can be enabled. Operations of system manager 224 are provided in greater detail as part of methods 5 and 6 below.

These and other capabilities and configurations, as well as ways in which entities of FIGS. 1-4 act and interact, are set forth in greater detail below. These entities may be further divided, combined, and so on. The environment 100 of FIG. 1 and the detailed illustrations of FIGS. 2-4 illustrate some of many possible environments and devices capable of employing the described techniques.

Example Methods

Figure 5:
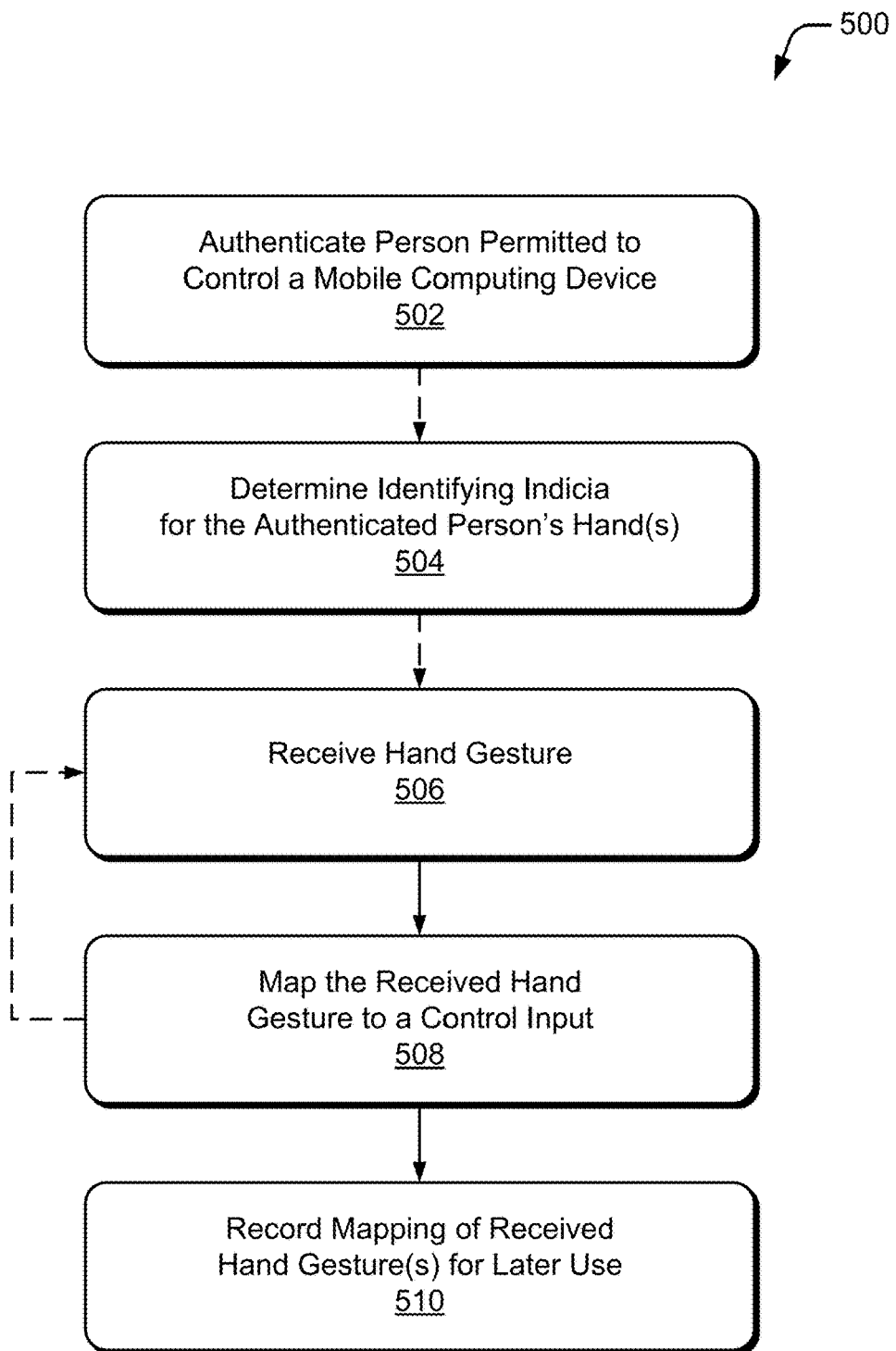
FIG. 5 illustrates an example method enabling better recognition of an occluded gesture by mapping gestures to control inputs for an authenticated person.
Figure 6:
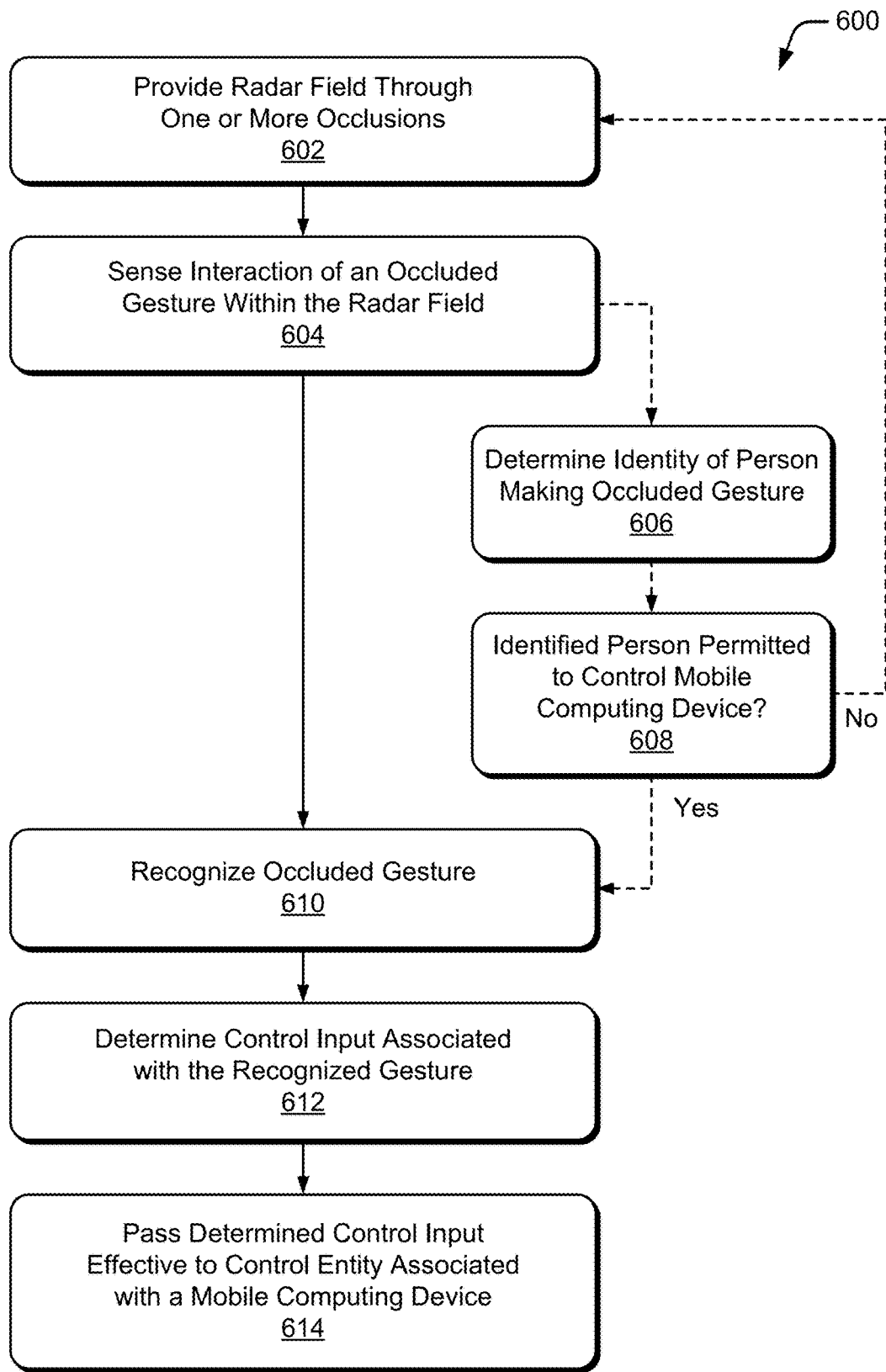
FIG. 6 illustrates an example method enabling occluded gesture recognition.

FIGS. 5 and 6 depict methods 500 and 600. Method 500 can be performed to better enable later recognition of an occluded gesture by mapping gestures to control inputs for an authenticated person. Method 600 enables occluded gesture recognition, and can be performed separate from or integrated in whole or in part with method 500. These methods and other methods herein are shown as sets of operations (or acts) performed but are not necessarily limited to the order or combinations in which the operations are shown herein. Further, any of one or more of the operations may be repeated, combined, reorganized, or linked to provide a wide array of additional and/or alternate methods. In portions of the following discussion reference may be made to environment 100 of FIG. 1 and entities detailed in FIGS. 2-4, reference to which is made for example only. The techniques are not limited to performance by one entity or multiple entities operating on one device.

At 502 a person permitted to control a mobile computing device is authenticated. This authentication can be performed in various manners known in the art of authenticating persons generally, such as receiving authentication credentials and confirming that these credentials match the person.

In some cases, however, authenticating the person permitted to control the mobile computing device authenticates a person based on identifying indicia. For example, gesture manager 206 may provide a radar field, receive a human-tissue reflection, determine identifying indicia based on the human-tissue reflection, and confirm that the identifying indicia matches recorded identifying indicia for the person permitted to control the mobile computing device. These identifying indicia can include various biometric identifiers, such as a size, shape, ratio of sizes, cartilage structure, and bone structure for the person or a portion of the person, such as the person's hand. These identify indicia may also be associated with a device worn by the person permitted to control the mobile computing device, such as device having a unique or difficult-to-copy reflection (e.g., a wedding ring of 14 carat gold and three diamonds, which reflects radar in a particular manner).

At 504, identifying indicia for a hand of the authenticated person is determined. This identifying indicia can be the indicia used for authentication at operation 502, though that is not required. Thus, in some cases the identifying indicia for the hand of the authenticated person includes providing a radar field, receiving multiple human-tissue reflections caused by the hand within the radar field, and determining the identifying indicia for the hand based on the multiple human-tissue reflections.

At 506, a hand gesture of the authenticated person's hand is received. In some cases the hand gesture is received responsive to presenting a proposed gesture and a proposed control input to cause with the proposed gesture. Thus, gesture manager 206 may present a gesture and its corresponding control input, such as in text: "make a flicking gesture" or showing an animation or video of the gesture, and then receive the gesture made by the authenticated person. This hand gesture can then be recorded as an aid in improved recognition, as the manner in which the gesture is made can vary from person to person. To do so, gesture manager 206 may provide a radar field, receive human-tissue reflections caused by the hand gesture within the radar field, and record gesture-specific indicia for the hand gesture based on the human-tissue reflections. These gestures may also be responsive to presentation of one or more control inputs and then receiving a gesture that is desired for use as that control. This permits users to decide the gesture that they want to use, such as a two-finger flick to advance media or pages of a document, a slashing movement to mute volume, or the various ASL gestures as noted above.

At 508, the received hand gesture is mapped to a control input. This can be the control input already associated with a presented gesture, or a new gesture selected to be mapped to a control input, and so forth. This mapping can be as simple as a look-up table, for example, whether personalized and custom or otherwise.

At 510, the identifying indicia and the mapping of the received hand gesture are recorded. This recordation is effective to enable a later-received hand gesture to be authenticated as from the person permitted to control the mobile computing device and mapped to the control input.

Method 600 enables occluded gesture recognition, thereby enabling recognition of gestures where the gesture actor (e.g., a hand, arm, or stylus) is occluded from a mobile computing device.

At 602, a radar field is provided through one or more occlusions, such as in the various manners noted above. Gesture manager 206 and/or system manager 224 directs the radar field to a user's hand, hands, or other gesture-making device or appendage. In one such case, the techniques provide the radar field direct to a region in which gestures are anticipated. This direction can be determined based on a location and/or orientation of the mobile computing device relative to a location of a person known to be associated with the mobile computing device. Thus, a mobile computing device within a front pocket of a person's shirt on the right side can determine this location and, based on it, determine a likely location of the user's hands. In such a case, the mobile computing device may also determine an orientation of the device relative to the person, such as through the use of accelerometers, acoustic sensors, thermal sensors, light sensors (e.g., front/rear facing cameras), and the like.

In another case, gesture manager 206 and/or system manager 224 tracks the particular person's hands after authentication by methods 500. Thus, the person is authenticated at a particular time and a position or location of his or her hands are tracked from that time until some later operation of method 600. By so doing, the hands' locations are known, which aids in responsive recognition as well as ensuring that control is permitted by a person having the right to control the mobile device.

Directing the radar field can also save power, as the radar field can be smaller than a more-general radar field occupying a larger volume. The location of the person's hand, for example, can be determined responsive to identifying the hand based on identifying indicia of the hand as described above. Occluded-gesture recognition system 104 may then track the hand to provide a directed radar field. In cases where the person is authenticated without using identifying indicia (e.g., by entry of a password), the identifying indicia can simply be a reliable manner of tracking the person's hand or hands, which may involve biometrics, or sufficient information about the hand to continue to track the hand, which is not necessarily information sufficient to authenticate it.

At 604, an interaction of an occluded gesture is sensed within the radar field. This interaction includes the many noted above, such as a up-and-down first to represent a "Yes" selection, a two-finger tap gesture, or a two-handed gesture, such as tapping opposing index, middle, and thumbs against each other through a plane or volume to represent an "eat" entry, as is the meaning in some sign languages. The sensed interaction can be processed by signal processor 216, which may provide gesture data for later determination as to the gesture intended, such as by system manager 224 or gesture manager 206 as noted herein.

Following 604, method 600 may proceed to operations 606 and 608, though this is optional. At 606, an identity of a person making the occluded gesture is determined. This determination can be made based on identifying indicia as described in detail above for the hand or appendage or after determining the identity of the person and that the person's hand is making the gesture. This identifying can be immediate or part of a prior credential authentication and then an ongoing tracking of the person or a hand that performs the occluded gesture. At 608, method 600 proceeds along "No" path to operation 602 if the person is not identified as being permitted to control the mobile computing device or along the "Yes" path to operation 610 if the person is identified as permitted to control the mobile computing device.

At 610, the occluded gesture is recognized, such as in the various manners described above. This occluded gesture can be recognized through one or more occlusions, such as wool for a wool jacket, denim for jeans, cotton for a blouse or shirt, or more-substantial occlusions, such as glass or wood furniture, covering and framing of a couch, or fiber-board wall in a home or apartment.

At 612, a control input associated with the recognized gesture is determined. Determining the control input associated with the recognized gesture can be based on a mapping of the recognized gesture to a control input or multiple control inputs previously associated with gestures. If there is more than one control input mapped to the recognized gesture, gesture manager 206 can determine which control input to associate the recognized gesture with based on other factors. These other factors may include control inputs associated with a currently executing program, a device having recently received a control input from the person, a most-common application or device for the user to control, various other historic data, and so forth.

At 614, the determined control input is passed to an entity effective to control the entity. As noted, this entity can be an operating system or application associated with mobile computing device 102, though it may also be passed to a remote device directly from occluded-gesture recognition system 104 or through mobile computing device 102.

Thus, a user may make a gesture to pause playback of media on a remote device and, at 614, the gesture is passed to the remote device effective to pause the playback. In some embodiments, therefore, occluded-gesture recognition system 104 and these techniques enable implementation of a universal controller for televisions, media devices, computers, appliances, and so forth.

In cases where operations 606 and 608 are performed, passing the control input or some prior operations is responsive to determining that the identified person is permitted to control the mobile computing device. By so doing control is not permitted by some other person, whether by accident or for malicious intent.

The preceding discussion describes methods relating to occluded gesture recognition. Aspects of these methods may be implemented in hardware (e.g., fixed logic circuitry), firmware, software, manual processing, or any combination thereof. These techniques may be embodied on one or more of the entities shown in FIGS. 1-4 and 7 (computing system 700 is described in FIG. 7 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 7:
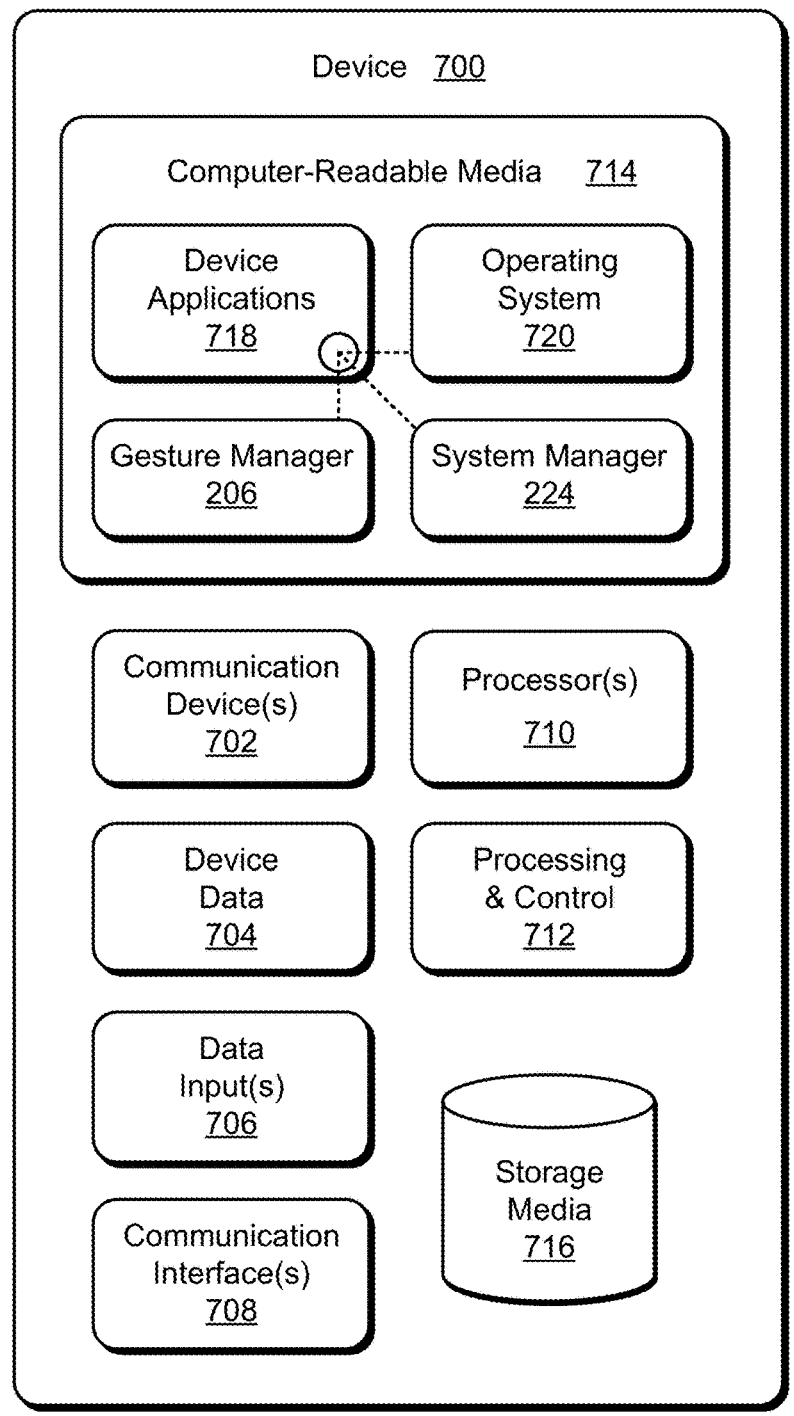
FIG. 7 illustrates an example device embodying, or in which techniques may be implemented that enable use of, occluded gesture recognition.

FIG. 7 illustrates various components of example computing system 700 that can be implemented as any type of client, server, and/or computing device as described with reference to the previous FIGS. 1-6 to implement an occluded gesture recognition. In embodiments, computing system 700 can be implemented as one or a combination of a wired and/or wireless wearable device, System-on-Chip (SoC), and/or as another type of device or portion thereof. Computing system 700 may also be associated with a user (e.g., a person) and/or an entity that operates the device such that a device describes logical devices that include users, software, firmware, and/or a combination of devices.

Computing system 700 includes communication devices 702 that enable wired and/or wireless communication of device data 704 (e.g., received data, data that is being received, data scheduled for broadcast, data packets of the data, etc.). Device data 704 or other device content can include configuration settings of the device, media content stored on the device, and/or information associated with a user of the device. Media content stored on computing system 700 can include any type of audio, video, and/or image data. Computing system 700 includes one or more data inputs 706 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

Computing system 700 also includes communication interfaces 708, which can be implemented as any one or more of a serial and/or parallel interface, a wireless interface, any type of network interface, a modem, and as any other type of communication interface. Communication interfaces 708 provide a connection and/or communication links between computing system 700 and a communication network by which other electronic, computing, and communication devices communicate data with computing system 700.

Computing system 700 includes one or more processors 710 (e.g., any of microprocessors, controllers, and the like), which process various computer-executable instructions to control the operation of computing system 700 and to enable techniques for, or in which can be embodied, occluded gesture recognition. Alternatively or in addition, computing system 700 can be implemented with any one or combination of hardware, firmware, or fixed logic circuitry that is implemented in connection with processing and control circuits which are generally identified at 712. Although not shown, computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 700 also includes computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 700 can also include a mass storage media device 716.

Computer-readable media 714 provides data storage mechanisms to store device data 704, as well as various device applications 718 and any other types of information and/or data related to operational aspects of computing system 700. For example, an operating system 720 can be maintained as a computer application with computer-readable media 714 and executed on processors 710. Device applications 718 may include a device manager, such as any form of a control application, software application, signal-processing and control module, code that is native to a particular device, a hardware abstraction layer for a particular device, and so on.

Device applications 718 also include any system components, engines, or managers to implement occluded gesture recognition. In this example, device applications 718 include gesture manager 206 and system manager 224.

CONCLUSION

Although embodiments of techniques using, and apparatuses enabling, occluded gesture recognition have been described in language specific to features and/or methods, it is to be understood that the subject of the appended claims is not necessarily limited to the specific features or methods described. Rather, the specific features and methods are disclosed as example implementations enabling occluded gesture recognition.

What is claimed is:

1. A method performed by a smartphone, the method comprising:
   determining that the smartphone is in a location corresponding to a pocket of a user based on sensor data provided by at least one sensor;
   providing a radar field emanating through an occlusion from inside the pocket to outside the pocket, the radar field encompassing a likely location where a gesture is to be made by the user;
   receiving, through the occlusion, a reflection of the gesture performed by the user; and
   recognizing, based on the reflection, that the gesture is associated with a first control input to control a volume of the smartphone or a second control input to advance to a next song in a playlist of the smartphone;
   responsive to recognizing that the gesture is associated with the first control input, adjusting the volume of the smartphone according to the gesture; or
   responsive to the gesture being associated with the second control input, playing the next song in the playlist.

2. The method of claim 1, further comprising:
   playing sound through earphones, wherein:
   the adjusting the volume of the smartphone comprises adjusting the volume of the sound played through the earphones; and
   the playing the next song in the playlist comprises playing the next song through the earphones.

3. The method of claim 1, wherein the adjusting the volume of the smartphone comprises selectively increasing or decreasing the volume according to the gesture.

4. The method of claim 1, wherein:
   the recognizing of the gesture comprises recognizing, based on the reflection, that the gesture is associated with the first control input, the second control input, or a third control input to pause a song played by the smartphone; and
   responsive to the gesture being associated with the third control input, pausing the song.

5. The method of claim 1, wherein:
   the recognizing of the gesture comprises recognizing, based on the reflection, that the gesture is associated with the first control input, the second control input, or a third control input to mute the smartphone; and
responsive to the gesture being associated with the third control input, muting the smartphone.

6. The method of claim 1, wherein:
the gesture comprises at least one of the following:
a first gesture performed using an appendage of the user; or
a second gesture performed using a stylus held by the user.

7. The method of claim 1, wherein:
the gesture comprises at least one of the following:
a swipe;
a tap;
a spread;
a squeeze;
a non-linear movement; or
a sign-language gesture.

8. The method of claim 1, wherein:
the determining that the smartphone is in the pocket comprises determining that the smartphone is in a pocket of the user's purse.

9. The method of claim 1, wherein:
the providing of the radar field comprises directing the radar field to encompass the likely location based on at least one of the location of the smartphone in the pocket or an orientation of the smartphone in the pocket.

10. A smartphone comprising:
at least one sensor configured to produce sensor data;
an occluded-gesture recognition system configured to:
determine that the smartphone is in a pocket of a user based on the sensor data provided by the at least one sensor;
provide a radar field emanating through an occlusion from inside the pocket to outside the pocket, the radar field encompassing a likely location where a gesture is to be made by the user;
receive, through the occlusion, a reflection of the gesture performed by the user; and
recognize, based on the reflection, that the gesture is associated with a control input to control a volume of the smartphone; and
a gesture manager configured to:
adjust the volume responsive to accepting the control input from the occluded-gesture recognition system.

11. The smartphone of claim 10, wherein:
the smartphone is configured to play sound through earphones or a speaker of the smartphone; and
the gesture manager is configured to adjust the volume of the sound played through the earphones or the speaker.

12. The smartphone of claim 10, wherein the gesture manager is further configured to selectively increase or decrease the volume responsive to accepting the control input from the occluded-gesture recognition system.

13. The smartphone of claim 10, wherein:
the occluded-gesture recognition system is further configured to:
receive, through the occlusion, a second reflection of a second gesture performed by the user; and
recognize, based on the second reflection, that the second gesture is associated with a second control input to advance to a next song in a playlist of the smartphone; and
the gesture manager is configured to cause the smartphone to play the next song in the playlist responsive to accepting the second control input from the occluded-gesture recognition system.

14. The smartphone of claim 13, wherein:
the occluded-gesture recognition system is further configured to:
receive, through the occlusion, a third reflection of a third gesture performed by the user; and
recognize, based on the third reflection, that the third gesture is associated with a third control input to pause a current song in the playlist or a fourth control input to mute the smartphone; and
the gesture manager is configured to selectively:
pause the current song in the playlist responsive to accepting the third control input from the occluded-gesture recognition system; or
mute the smartphone responsive to accepting the fourth control input from the occluded-gesture recognition system.

15. The smartphone of claim 10, wherein the at least one sensor comprises at least one of the following:
an accelerometer;
an acoustic sensor;
a thermal sensor;
a light sensor; or
a camera.

16. A smartphone comprising:
at least one sensor configured to produce sensor data;
an occluded-gesture recognition system configured to:
determine that the smartphone is in a pocket of a user based on the sensor data provided by the at least one sensor;
provide a radar field emanating through an occlusion from inside the pocket to outside the pocket, the radar field encompassing a likely location where a gesture is to be made by the user;
receive, through the occlusion, a reflection of the gesture performed by the user; and
recognize, based on the reflection, that the gesture is associated with a control input to advance to a next song in a playlist; and
a gesture manager configured to:
cause the smartphone to play the next song in the playlist responsive to accepting the control input from the occluded-gesture recognition system.

17. The smartphone of claim 16, wherein:
the smartphone is configured to play the next song through earphones or a speaker of the smartphone.

18. The smartphone of claim 16, wherein:
the occluded-gesture recognition system is further configured to:
receive, through the occlusion, a second reflection of a second gesture performed by the user; and
recognize, based on the second reflection, that the second gesture is associated with a second control input to control a volume of the smartphone; and
the gesture manager is configured to adjust the volume responsive to accepting the second control input from the occluded-gesture recognition system.

19. The smartphone of claim 18, wherein:
the occluded-gesture recognition system is further configured to:
receive, through the occlusion, a third reflection of a third gesture performed by the user; and
recognize, based on the third reflection, that the third gesture is associated with a third control input to pause a current song in the playlist or a fourth control input to mute the smartphone; and the gesture manager is configured to selectively:
  pause the current song in the playlist responsive to accepting the third control input from the occluded-gesture recognition system; or
  mute the smartphone responsive to accepting the fourth control input from the occluded-gesture recognition system.

20. The smartphone of claim 16, wherein the at least one sensor comprises at least one of the following:
an accelerometer;
an acoustic sensor;
a thermal sensor;
a light sensor; or
a camera.

* * * * *